United States Patent
Miyazono

(10) Patent No.: US 9,919,567 B2
(45) Date of Patent: Mar. 20, 2018

(54) TIRE AND TIRE MANUFACTURING METHOD

(71) Applicant: BRIDGESTONE CORPORATION, Chuo-ku, Tokyo (JP)

(72) Inventor: Toshiya Miyazono, Suginami-ku (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 732 days.

(21) Appl. No.: 14/379,193

(22) PCT Filed: Feb. 15, 2013

(86) PCT No.: PCT/JP2013/053762
§ 371 (c)(1),
(2) Date: Aug. 15, 2014

(87) PCT Pub. No.: WO2013/122232
PCT Pub. Date: Aug. 22, 2013

(65) Prior Publication Data
US 2016/0016439 A1    Jan. 21, 2016

(30) Foreign Application Priority Data

Feb. 17, 2012   (JP) .................................. 2012-032892
Feb. 17, 2012   (JP) .................................. 2012-032893
(Continued)

(51) Int. Cl.
*B60C 13/00*     (2006.01)
*B29C 33/42*     (2006.01)
(Continued)

(52) U.S. Cl.
CPC .......... *B60C 13/00* (2013.01); *B29C 33/3842* (2013.01); *B29C 33/424* (2013.01);
(Continued)

(58) Field of Classification Search
CPC . B60C 11/032; B60C 2011/133; B60C 13/00; B60C 13/001; B60C 13/002; B60C 13/02; B29D 30/0601
See application file for complete search history.

(56) References Cited

U.S. PATENT DOCUMENTS

2001/0032691 A1* 10/2001 Ohsawa .................. B60C 11/13
152/209.18
2009/0218019 A1    9/2009 Paturle

FOREIGN PATENT DOCUMENTS

DE      102004010060 A1    9/2005
EP           1323550 A1    7/2003
(Continued)

OTHER PUBLICATIONS

International Search Report for PCT/JP2013/053762 dated Apr. 16, 2014 [PCT/ISA/210].
Written Opinion for PCT/JP2013/053762 dated Apr. 16, 2014 [PCT/ISA/237].
Communication dated Mar. 24, 2015 from the European Patent Office in counterpart application No. 13749509.9.
(Continued)

*Primary Examiner* — Robert C Dye
(74) *Attorney, Agent, or Firm* — Sughrue Mion, PLLC

(57) ABSTRACT

A tire (pneumatic tire 1) provided with regularly arranged concave portions (concave portions 80) dented toward a tire inner side direction from a tire surface (tire surface 50) in at least some areas on the tire surface wherein in a direction along with the tire surface, a maximum width L of the concave portion is in a range of 0.1 micrometer or more to less than 50 micrometers, a depth D reaching to a point of the innermost part of the concave portion toward the tire inner side direction from the tire surface is within a range of 0.1 micrometer or more to less than 10 micrometers, in the direction along with the tire surface, an arrangement interval P of the concave portions is within a range more largely than 0.1 micrometer to less than 100 micrometers.

10 Claims, 11 Drawing Sheets

(30) Foreign Application Priority Data

| Feb. 17, 2012 | (JP) | 2012-032894 |
|---|---|---|
| Feb. 17, 2012 | (JP) | 2012-033339 |
| Feb. 17, 2012 | (JP) | 2012-033343 |

(51) Int. Cl.
  *B60C 13/02* (2006.01)
  *B29C 33/38* (2006.01)
  *B29C 35/02* (2006.01)
  *B29D 30/06* (2006.01)
  *B60C 11/03* (2006.01)
  B29L 30/00 (2006.01)
  B60C 11/00 (2006.01)
  B29L 31/00 (2006.01)

(52) U.S. Cl.
  CPC .......... *B29C 35/02* (2013.01); *B29D 30/0601* (2013.01); *B60C 11/03* (2013.01); *B60C 13/02* (2013.01); B29L 2030/00 (2013.01); B29L 2031/757 (2013.01); B60C 11/00 (2013.01); B60C 2011/0341 (2013.01)

(56) References Cited

FOREIGN PATENT DOCUMENTS

| EP | 1462277 A1 | 9/2004 |
|---|---|---|
| JP | 06-080003 A | 3/1994 |
| JP | 890586 A | 4/1996 |
| JP | 2003-246209 A | 9/2003 |
| JP | 2003-252012 A | 9/2003 |
| JP | 2004-196145 A | 7/2004 |
| JP | 2005324685 A | 11/2005 |
| JP | 2009-512584 A | 3/2009 |
| JP | 2009241369 A | 10/2009 |
| JP | 2010-260376 A | 11/2010 |
| WO | 2008096879 A1 | 8/2008 |
| WO | 2011118856 A1 | 9/2011 |
| WO | 2013/100196 A1 | 7/2013 |

OTHER PUBLICATIONS

Communication dated Aug. 18, 2015 from the Japanese Patent Office in counterpart application No. 2012-033339.

* cited by examiner

TIRE AND TIRE MANUFACTURING METHOD

CROSS REFERENCE TO RELATED APPLICATIONS

This application is a National Stage of International Application No. PCT/JP2013/053762 filed Feb. 15, 2013, claiming priority based on Japanese Patent Application Nos. 2012-033339, 2012-033343, 2012-032892, 2012-032893 and 2012-032894 filed Feb. 17, 2012, the contents of all of which are incorporated herein by reference in their entirety.

TECHNICAL FIELD

The present invention relates to a tire and a tire manufacturing method.

BACKGROUND ART

In recent years, use of the ultra-fine processing technology for forming a few micrometers depression and projection in the tire surface of a pneumatic tire (hereinafter, referred to as "tire") is popularizing (for example, refer to Patent Literature 1).

Such an ultra-fine processing technology is expected as one of the art effective in inhibition of rotation resistance of a tire. Specifically, there is frictional resistance of air (open air) as one of the causes which rotation resistance generates. With the ultra-fine processing technology mentioned above, when a tire rotates, the tire by which depression and projection were formed in the tire surface makes the tire surface generate the turbulent flow of air intentionally, and can form the relief layer of air in it. It is considered that the tire by which the relief layer of air was formed in the tire surface can control the rotation resistance of a tire because frictional resistance with the air positioned in the tire outer side direction of a relief layer can be reduced when a tire rotates.

However, in the tire related to conventional technology, although depression and projection can be formed in the tire surface with ultra-fine processing technology, the optimal shape and arrangement interval of the depression and projection are not taken into consideration. As a result, in the tire related to conventional technology, when a tire rotated, the relief layer of air was disturbed and there was a problem that rotation resistance could not fully be controlled.

CITATION LIST

Patent Literature

[Patent Literatures 1]
Japanese Patent Application Publication No. 2003-246209, A

SUMMARY OF INVENTION

A feature of the present invention is summarized as a tire (pneumatic tire 1) provided with regularly arranged concave portions (concave portions 80) dented toward a tire inner side direction from a tire surface (tire surface 50) in at least some areas on the tire surface wherein in a direction along with the tire surface, a maximum width L of the concave portion is in a range of 0.1 micrometer or more to less than 50 micrometers, a depth D reaching to a point of the innermost part of the concave portion toward the tire inner side direction from the tire surface is within a range of 0.1 micrometer or more to less than 10 micrometers, in the direction along with the tire surface, an arrangement interval P of the concave portions is within a range more largely than 0.1 micrometer to less than 100 micrometers.

According to this tire, the concave portion is regularly arranged to at least some areas on the tire surface. The maximum width L of a concave portion is within the range of 0.1 micrometer or more to less than 50 micrometers, the depth D of the concave portion is within the range of 0.1 micrometer or more to less than 10 micrometers. The arrangement interval P of the concave portion is within the range of more largely than 0.1 micrometer to less than 100 micrometers.

The tire can form the optimal relief layer of air (open air) for some areas on the tire surface with the air around a tire, when a tire rotates by arranging a such-shaped concave portion regularly with the above arrangement interval. Therefore, because the tire can reduce the frictional resistance of the tire surface and air more, it can control the rotation resistance of the tire further.

A feature of the present invention is summarized as a tire provided with regularly arranged convex portions (convex portions 90) projected toward a tire outer side direction from a tire surface in at least some areas on the tire surface wherein in a direction parallel with the tire surface, a maximum width L of the convex portion in a range of 0.1 micrometer or more to less than 50 micrometers, a height H reaching to a point of the outermost part of the concave portion toward the tire outer side direction from the tire surface is within a range of 0.1 micrometer or more to less than 10 micrometers, in the direction along with the tire surface, an arrangement interval P of the convex portion is within a range of more largely than 0.1 micrometer and less than 100 micrometers.

According to this tire, the convex portion is regularly arranged to at least some areas on the tire surface. Maximum width L of a convex portion is within the range of 0.1 micrometer or more to less than 50 micrometers, height H of a convex portion is within the range of 0.1 micrometer or more to less than 10 micrometers. Arrangement interval P of a convex portion is within the range more largely than 0.1 micrometer or more to less than 100 micrometers.

The tire can form the relief layer of the optimal air (open air) for some areas on the tire surface with the air around the tire, when a tire rotates by arranging a such-shaped convex portion regularly with the above arrangement interval. Therefore, because the tire can reduce the frictional resistance of the tire surface and air more, it can control the rotation resistance of the tire further.

Another feature of the present invention is summarized that the tire comprising a tread part (tread part 40) and a pair of tire side part (tire side part 30) formed in the outside in the tread width direction of the tread part wherein some areas on the tire surface (tire side surface 31) are areas for forming an tire outer surface in the tire side part.

Another feature of the present invention is summarized that the tire comprising a tread part and a pair of tire side parts formed in the outside in the tread width direction of the tread part wherein a groove (groove 10) extends to a tire circumferential direction or a direction intersects the tire circumferential direction is formed on the tread part, the groove has a pair of groove wall surfaces (groove wall surface 11a) and a groove bottom side (groove bottom side 11b), some areas on the tire surface are areas for forming either the pair of groove wall surfaces or the groove bottom side at least.

A feature of the present invention is summarized as a tire manufacturing method for manufacturing a tire using a tire molding die (for example, upper side mold) for molding the tire before vulcanization as a green tire, wherein a convex formation part (convex formation part) for molding the convex portion in at least some areas on the tire surface or a concave formation part (for example, concave formation part) for molding the concave portion in at least some areas on the tire surface is formed on an inner skin (for example, inner skin) of the tire molding die, and comprising a vulcanization process (process) for molding the tire according to one of the claims 1 to 4 using the tire molding die with molding the convex portion or the concave portion to the green tire.

Another features of the present invention is summarized that the above tire manufacturing method wherein the convex formation part or the concave formation part is formed in the inner skin of the tire molding die by laser processing.

DESCRIPTION OF EMBODIMENTS

Figure 1:
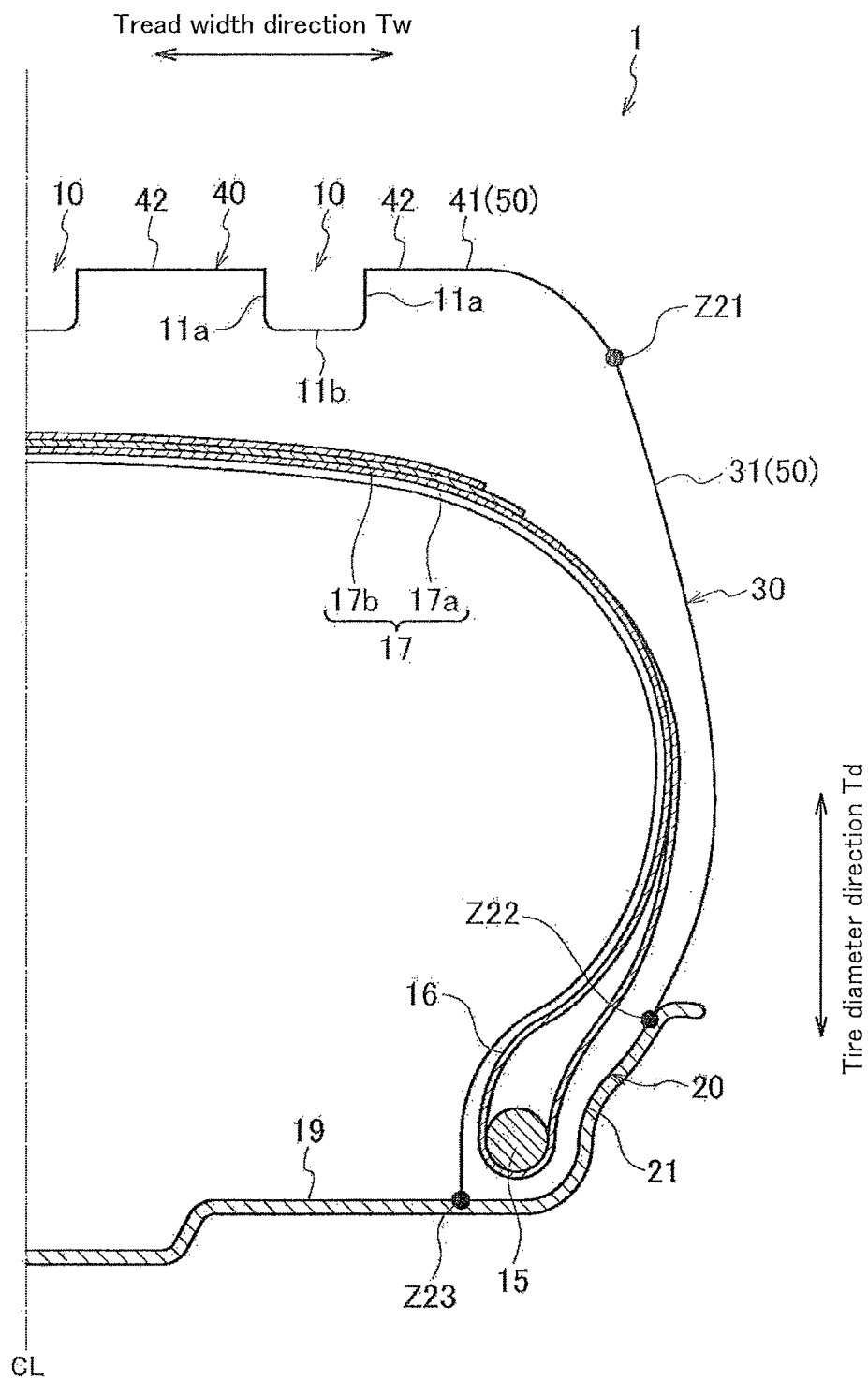
FIG. 1 is a sectional view in a tire width direction for explaining the structure of pneumatic tire 1 related to an embodiment of the present invention.

Next, an embodiment of a tire according to the present invention is described with reference to drawings. It is noted that, in the following description of the drawings, the same or similar reference numerals are used to designate the same or similar portions. Provided that, it should be appreciated that the drawings are schematically shown and the ratio and the like of each dimension are different from the real ones. Accordingly, specific dimensions and the like should be determined in consideration of the explanation below. Further, among the drawings, the respective dimensional relations or ratios may differ.

1st Embodiment (1-1) Overall Schematic Structure of Tire

Below, the whole pneumatic tire structure is explained with reference to drawings. FIG. 1 is a tread width direction sectional view explaining the structure of pneumatic tire 1. Pneumatic tire 1 has a pattern of line symmetry on the basis of tire equatorial line CL, in FIG. 1, only the one side of the tire equatorial line CL of pneumatic tire 1 is described.

Pneumatic tire 1 related to this embodiment is provided with tread part 40 and a pair of tire side parts 30 formed in the tread width direction outside of tread part 40. Specifically, pneumatic tire 1 has a pair of bead parts 20 which have bead core 15, a pair of tire side parts 30, and tread part 40 which stands in a row on the pair of tire side parts 30. In FIG. 1, bead part 20, tire side part 30, and tread part 40 are describing only the one side of the tire equatorial line CL of pneumatic tire 1.

And, pneumatic tire 1 is provided with carcass 16 over between a pair of bead cores 15 in toroidal shape. Between tread part 40 and carcass 16, belt layer 17 constituted by multiple belts 17a or 17b is provided.

Further, the pneumatic tire 1a is equipped on a regular rim 19. The regular rim 19 is a rim defined by the standard. In the area where a tire is produced or used, the standard is decided by the effective industrial requirements. For example, it is prescribed by "year book of The TIRE and rim association Inc." in the United States of America, "standards manual of The European TIRE and rim technical organization" in Europe, "jatma year book" of the Japan Automobile Tire Manufacturers Association in Japan.

In tread part 40, groove 10 extends a tire circumferential direction or in the direction intersects a tire circumferential direction is formed. A tire circumferential direction means the direction which intersects perpendicularly with both tread width direction Tw and tire diameter direction Td. Plural grooves 10 are formed with a space in tread width direction Tw. Groove 10 has a pair of groove wall surfaces 11a, and groove bottom side 11b.

Here, pneumatic tire 1 related to this embodiment has tire surface 50 exposed to the open air. Below, tire surface 50 related to this embodiment is explained.

Tire surface 50 is comprised by tire outer surface 41 (in the following, "tread surface 41") of tread part 40, and tire outer surface 31 (in the following, "tire side surface 31") of tire side part 30. Tread surface 41 has a ground contact surface 42, a pair of groove wall surfaces 11a, and groove bottom side 11b.

In addition, when regular load is applied to the pneumatic tire which has regular internal pressure, the width of tread width direction Tw on surface 41 of a tread serves as a range which contacts a road surface. In the example of FIG. 1, the end of the tread width direction Tw outside on surface 41 of a tread is shown as end Z21.

Regular internal pressure is the air pressure specified by the measuring method of the tire of the Year Book version in the 2008 fiscal year of JATMA (Japan Automobile Tire Manufacturers Association). Regular load is the load equivalent to the maximum load capability at the time of applying the single ring specified to "JATMA Year Book."

In addition, the range of tire side surface 31 of tire side part 30 is a range from end Z21 of tire outer surface 41 of tread part 40 to end Z22 where pneumatic tire 1 contacts regular rim 19. End Z22 is an end where pneumatic tire 1 contacts regular rim 19, when regular load is applied to the pneumatic tire which has the pressure inside regular.

Moreover, bead part 20 has rim contact side 21 which contacts regular rim 19. In this embodiment, the range of rim contact side 21 is a range between ends Z23 of a tread width direction Tw inner side where pneumatic tire 1 contacts regular rim 19 from end Z22 where tire side surface 31 contacts regular rim 19. It should be paid attention to that rim contact side 21 is not included in tire surface 50.

In addition, in this embodiment, concave portion 80 dented toward a tire inner side from tire surface 50 is regularly arranged in at least some areas on tire surface 50. In this embodiment, the direction of a tire inner side aims to go inside a tire in the normal direction on tire surface 50. The tire outer side direction aims to go to the outside of a tire in the normal direction on tire surface 50.

Concave portion 80 is formed using ultra-fine processing technology. The shape of concave portion 80 and the details of arrangement are mentioned later. In addition In this embodiment, some areas on tire surface 50 in which concave portion 80 is formed are areas in which tire side surface 31 of tire side part 30 is formed. And the more the range in which concave portion 80 is formed is wide, the more it is effective. Moreover, for tire side surface 31 requires the space for marking characters, such as tire specification, by regulation, it is more preferred to be unable to form in the whole range (100%) substantially, but to form concave portion 80 in the widest possible range except for this space. Provided that, it should be paid attention to that it is possible to generate the effect even if the range in which concave portion 80 is formed is a part of tire side surface 31.

(1-2) Shape and Arrangement of Concave Portion

Figure 2:
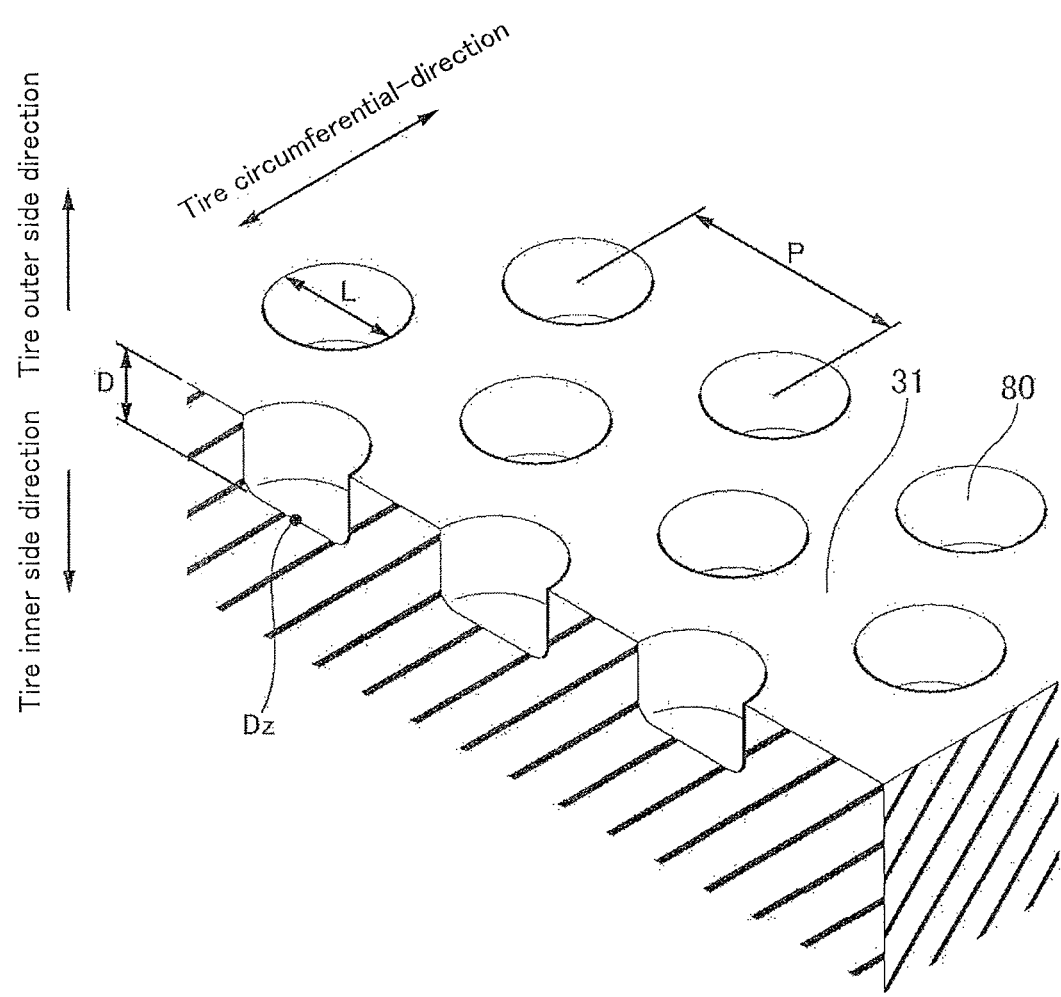
FIG. 2 is an expansion perspective view of tire outer surface 31 of tire side part 30 in which concave portion 80 related to a 1st embodiment of the present invention is formed.

Next, with reference to FIG. 2, the shape and arrangement of concave portion 80 are explained. FIG. 2 is an expansion perspective view of concave portion 80 formed in tire side surface 31 using ultra-fine processing technology.

As shown in the figure, when tire side surface 31 is observed to the normal direction along with the normal direction of tire side surface 31, circle-shaped concave portion 80 is formed in tire side surface 31 with pneumatic tire 1 related to this embodiment.

In addition, when the direction along with tire side surface 31 (tire surface 50) is made into the width direction of concave portion 80, maximum width L of concave portion 80 is within the range of 0.1 micrometer or more to less than 50 micrometers. "The direction along with tire side surface 31" can be put in another way as "a direction parallel to tire side surface 31." In this embodiment, because concave portion 80 is circle shape, maximum width L of concave portion 80 is equal to the diameter of concave portion 80. According to this embodiment, maximum width L of concave portion 80 is set to 0.6 micrometer. Maximum width L of concave portion 80 may be set to average value Lave of maximum width L of a concave portion. Here, average value Lave is average value of maximum width L of concave portion 80 of plurality (for example, 100 pieces) extracted at random.

Moreover, as for maximum width L of concave portion 80, it is more preferred that it is in the above range within the range of 0.1 micrometer or more to 5 micrometers or less. When maximum width L is smaller than 0.1 micrometer, at the time of the vulcanization in a manufacture process, rubber cannot go into the edge of the concave portion of a mold easily, and shape formatting becomes difficult. When maximum width L is larger than 5 micrometers, particulates etc. go into concave portion 80 during tire use, and tire appearance is worsened.

In addition, in the direction from tire surface 50 to the inside of a tire, depth D of concave portion 80 to point DZ of the innermost part of concave portion 80 is within the range of 0.1 micrometer or more to less than 10 micrometers. In this embodiment, depth D of concave portion 80 is 0.24 micrometer. In addition, average value Dave of depth D of a concave portion can be used for depth D of concave portion 80. Here, average value Dave is average value of depth D of concave portion 80 of plurality (for example, 100 pieces) extracted at random.

Further, a ratio with maximum width L of concave portion 80 may prescribe depth D of concave portion 80. Specifically, depth D of concave portion 80 and maximum width L may specify that it satisfies the relation of 0.1<=D/L<=10. According to this embodiment, the relation between depth D (0.24 micrometer) of concave portion 80 and maximum width L of concave portion 80 (0.6 micrometer) is set to D/L=0.4.

Moreover, as for depth D of concave portion 80, it is more preferred that it is in the range which satisfies the relation mentioned above within the range of 0.1 or more to 5 micrometers or less. When depth D of concave portion 80 is smaller than 0.1 micrometer, because it becomes easy to be affected by the influence of the deformation with the passage of time of rubber, the effect decreases. When depth D of concave portion 80 is larger than 5 micrometers, rubber cannot go into the edge easily, and shape formatting becomes difficult.

In addition, in the direction along with the tire surface, arrangement interval P of concave portion 80 is within the range of more largely than 0.1 micrometer to less than 100 micrometers. Arrangement interval P means the distance of the center of concave portion 80, and the center of other concave portions 80 which adjoin most close. According to this embodiment, arrangement interval P is set as 1.2 micrometers. In addition, as arrangement interval P of concave portion 80, average value Pave of arrangement interval P of concave portion 80 may be used. Here, average value Pave is average value of the distance between concave portions 80 of plurality (between centers) (for example, 100 pieces) sampled at random.

Further, a ratio with width L of concave portion 80 may prescribe arrangement interval P of concave portion 80. Specifically, as for arrangement interval P and width L of concave portion 80, it is preferred to satisfy the relation of 1.0<P/L, and it may be made to satisfy the relation of 1.05<=P/L<=5 especially. According to this embodiment, arrangement interval P of concave portion 80 (1.2 micrometers) and maximum width L of concave portion 80 (0.6 micrometer) are set as P/L=2.

In addition, in the range which satisfies the above relation, as for arrangement interval P of concave portion 80, it is more preferred that it is in within the range larger than 0.1 micrometer, nor more than 10 micrometers. In the case of 0.1 micrometer and under, arrangement interval P cannot prepare shape of a concave portion. Distortion produced in concave portion 80 which can serve as a basing point of the surface crack which finally spoils appearance will be relaxed if arrangement interval P is short. However when arrangement interval P is larger than 10 micrometers, the relaxation effect decreases and a surface crack is yielded.

(1-3) Structure of Tire Molding Die

Next, tire molding metallic mold 100 for molding pneumatic tire 1 related to this embodiment with reference to drawings is explained.

The inside of the space (it is called vulcanization space) formed between a bladder and a mold is filled up with tire TR before vulcanization. Tire TR has a tread part (it is equivalent to tread part 40 in FIG. 1), and a sidewall part (it is equivalent to tire side part 30 in FIG. 1). Concave portion 80 is formed in a sidewall part.

In the above mold, the concave formation part for molding concave portion 80 is formed in tire side surface 31 of a sidewall part. In addition, the detailed structure of a concave formation part is mentioned later.

Here, although it is possible to use chemical-polishing processing art etc. as art of processing the inner skin of a mold, in this embodiment, the concave formation part is formed using laser processing technology. This is based on the following reason. That is, it is for forming more correctly the optimal shape and the optimal arrangement interval of concave portion 80 in tire side surface 31. In order to form concave portion 80 in tire side surface 31, it is more preferred to apply a rubber member with low rubber hardness to the rubber member which comprises tire side surface 31.

(1-4) Operation and Effect

In pneumatic tire 1 related to this embodiment, concave portions 80 are regularly arranged to at least some areas on tire surface 50. Specifically, concave portion 80 is arranged regularly in tire outer surface 31 (tire side surface 31) of tire side part 30.

Moreover, maximum width L of concave portion 80 is within the range of 0.1 micrometer or more to less than 50 micrometers, depth D of concave portion 80 is within the range of 0.1 micrometer or more to less than 10 micrometers. Arrangement interval P of concave portion 80 is within the range less than 100 micrometers more largely than 0.1 micrometer.

Because such-shaped concave portion 80 was regularly arranged with the above arrangement interval in pneumatic tire 1, with the air (open air) of the circumference of a tire, the relief layer of the optimal air for tire side surface 31 can be formed at the time of rotation of pneumatic tire 1.

Thus, according to pneumatic tire 1 related to this embodiment, because the frictional resistance of tire surface 50 and the air of the circumference of a tire can be reduced more, the rotation resistance of a tire can be controlled further.

Moreover, concave portions 80 are formed in tire side surface 31 in pneumatic tire 1 related to this embodiment. It enables the pneumatic tire 1 to control the rotation resistance of a tire over a long time, because concave portion 80 is not easily worn out for example, compared with the case where concave portion 80 is formed in the ground contact surface 42 of tread part 40.

And generally, the smooth surface is formed in tire side surface 31 in many cases. When pneumatic tire 1 rotates such a smooth surface, the relief layer of air is hard to be formed and the frictional resistance of air becomes large easily.

In pneumatic tire 1 related to this embodiment, because the frictional resistance of air forms concave portion 80 in tire side surface 31 which becomes large easily, compared with the case where concave portion 80 is formed, the frictional resistance of air can be efficiently reduced certainly into other portions.

(1-5) Modification

Next, the modification related to a 1st embodiment is explained.

(1-5.1) Modification 1

Although some areas on tire surface 50 in which concave portion 80 is formed mentioned as the example the case where it was tire side surface 31 and explained it by the embodiment mentioned above, this area may be an area of a pair of groove wall surfaces 11a, or groove bottom surface 11b in which either is formed at least.

Because concave portion 80 is not easily worn out, for example compared with the case where it is formed in a ground contact surface 42 of tread part 40 according to pneumatic tire 1 related to this modification, it becomes possible to control the rotation resistance of a tire over a long time.

In addition, some areas on the tire surface 50 formed the concave portion 80 may be areas in which any one field formed a tire side surface 31, a pair of groove wall surfaces 11a, or groove bottom surface 11b, and may be areas in which all these fields are formed.

(1-5.2) Modification 2

Next, modification 2 related to a 1st embodiment is explained.

Here, the structure of concave portion 80 is not limited to the structure of concave portion 80 related to a 1st embodiment. Below, the structure of other concave portions 80 is explained.

For example, in the embodiment mentioned above, when tire side surface 31 was seen toward the direction of a tire inner side along with the normal direction of tire side surface 31, concave portion 80 was formed in circle shape, but concave portion 80 may be polyhedron shape.

Figure 4:
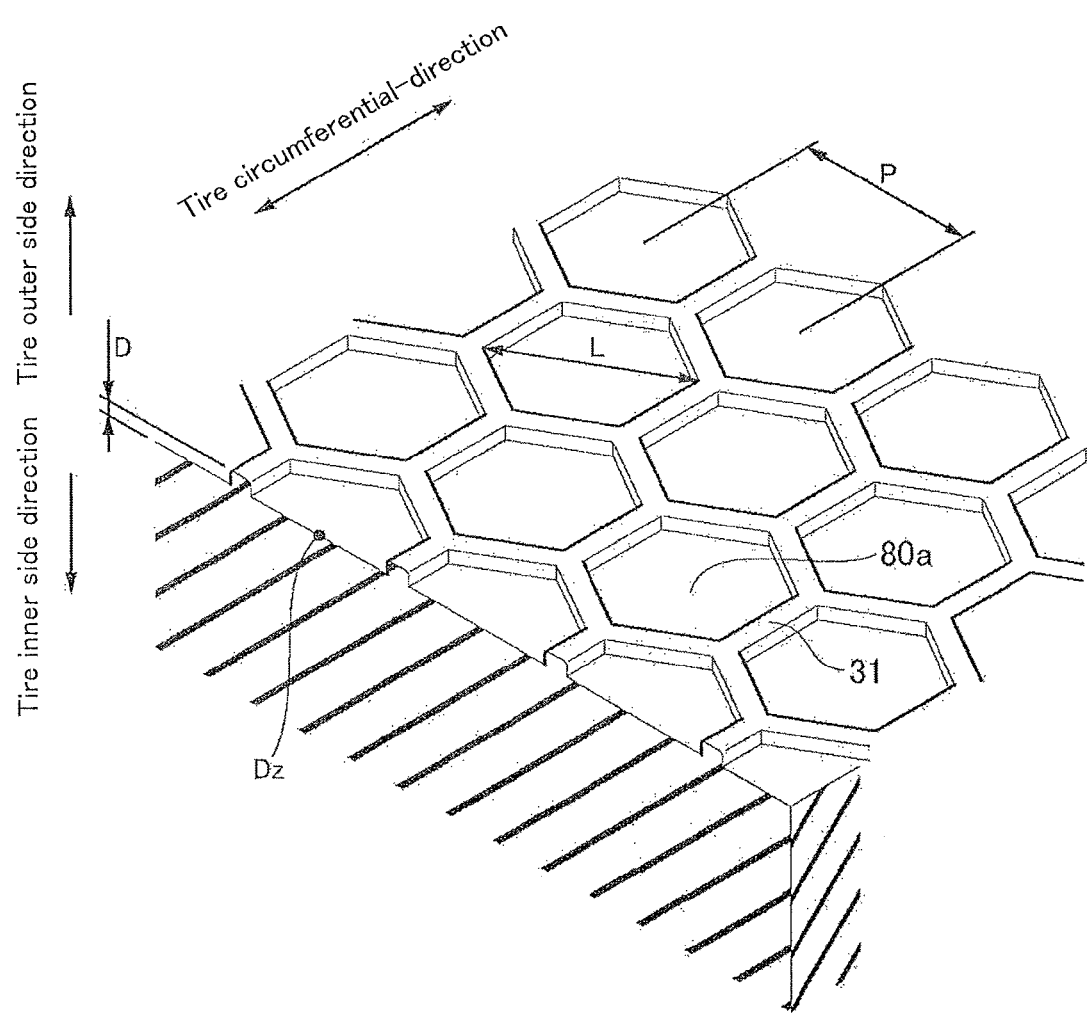
FIG. 4 is a partial perspective view showing an example of concave portion 80 related to a modification of the present invention.

In FIG. 4, an example of concave portion 80a related to this modification is shown. As shown in the figure, concave portion 80a is formed in the hexagon when tire surface 50 is seen toward the direction of a tire inner side along with the normal direction of tire side surface 31.

Moreover, in this case, it is preferred that maximum width L of concave portion 80a shall be 10 micrometers. As for depth D of concave portion 80a, being referred to as 2 micrometers is preferred. As for arrangement interval P of concave portion 80a, being referred to as 12 micrometers is preferred.

(1-5.3) Modification 3

Figure 5:
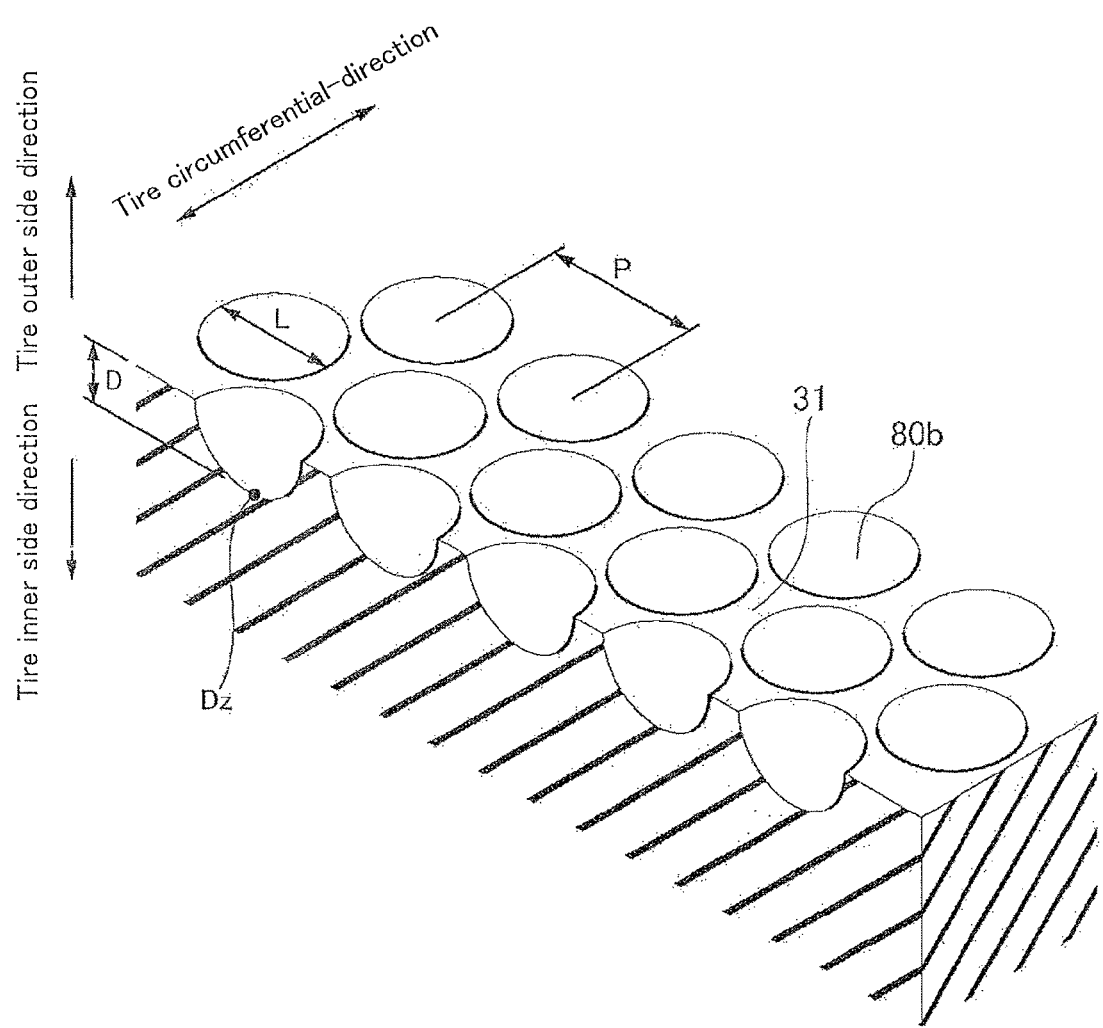
FIG. 5 is a partial perspective view showing an example of concave portion 80 related to a modification of the present invention.

And an example of other concave portions 80b related to modification 3 is shown in FIG. 5. As shown in the figure, the bottom is formed in curved surface shape in concave portion 80b.

And, in this case, it is preferred that maximum width L of concave portion 80b shall be 50 micrometers. As for depth D of concave portion 80b, being referred to as 25 micrometers is preferred. As for arrangement interval P of concave portion 80b, being referred to as 55 micrometers is preferred.

(1-5.4) Modification 4

Figure 6:
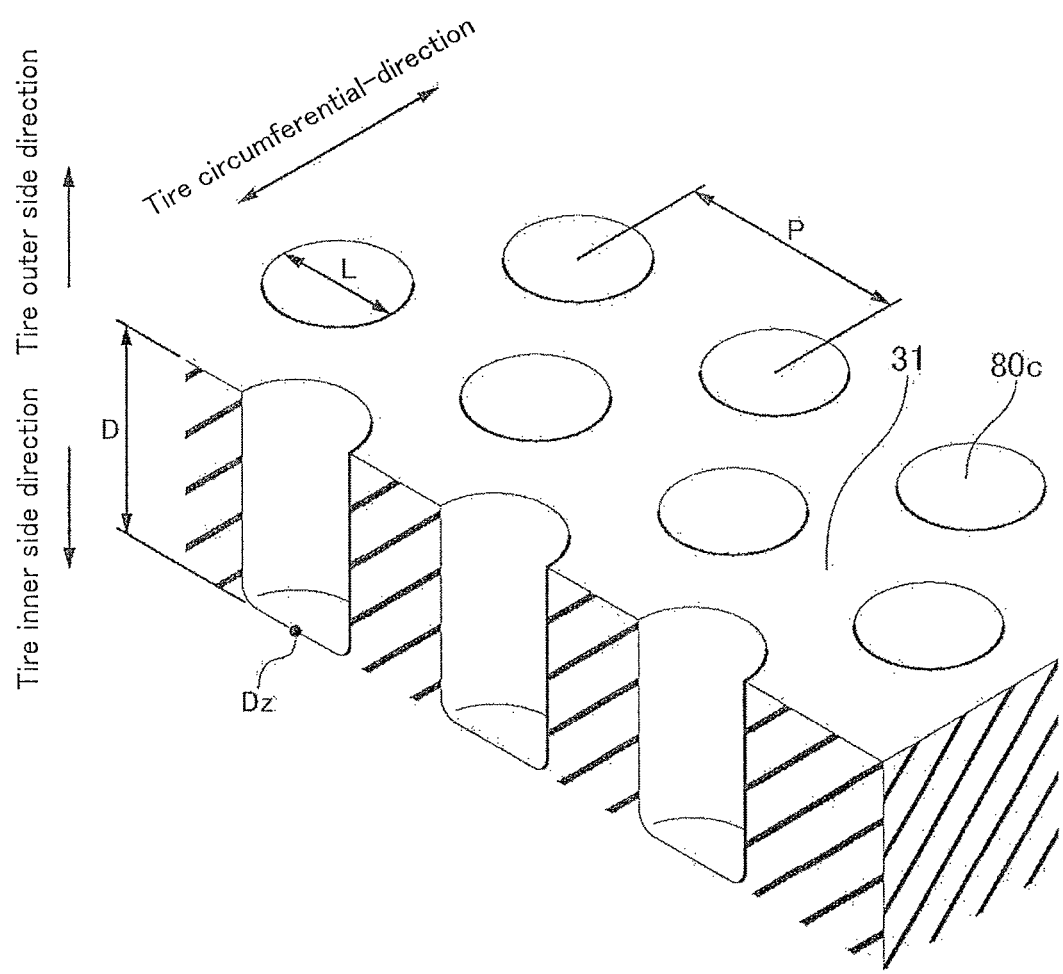
FIG. 6 is a partial perspective view showing an example of concave portion 80 related to a modification of the present invention.

And in FIG. 6, an example of other concave portions 80c related to modification 4 is shown. As shown in the figure, by concave portion 80c, depth D of concave portion 80c is formed so that it may become large compared with width L.

And, in this case, as for maximum width L of concave portion 80c, being referred to as 7 micrometers is preferred. As for depth D of concave portion 80c, being referred to as 70 micrometers is preferred. As for arrangement interval P of concave portion 80c, being referred to as 9 micrometers is preferred.

As mentioned above, in pneumatic tire 1 related to this modification, because said concave portions 80a thru/or 80c are arranged regularly, when pneumatic tire 1 rotates, the relief layer of the optimal air can be formed. That is, according to pneumatic tire 1 related to this modification, the rotation resistance of a tire can be controlled further.

(1-6) Comparative Evaluation

Next, in order to clarify the effect of the present invention further, the comparative evaluation performed using the pneumatic tire related to the following comparative examples and embodiment is explained. In addition, the present invention is not limited at all by these examples.

(1-6.1) Explanation of Comparative Example and Embodiment

In order to evaluate the performance of the rotation resistance for the pneumatic tire which has a concave portion, the following comparative evaluation was carried out. Concretely, the following conventional example, comparative examples A1 thru/or A10, and embodiments A1 through A30 were prepared. It is explained using Table 1.

In addition, the tire of size 155/65R13 was used as a pneumatic tire for an example for the comparative example for the conventional example. Moreover except the structure shown below, other structures are the same in a conventional example, a comparative example, and an embodiment.

First, the pneumatic tire related to a conventional example is explained. As a pneumatic tire related to a conventional example, the tire by which the concave portion is not formed in the surface was used.

Next, the pneumatic tire related to a comparative example and the pneumatic tire related to an embodiment are explained. The tire in which the concave portion is formed was used for a pair of groove wall surfaces in a tire side part or a tread part as the pneumatic tire related to comparative examples A1 through A10, and a pneumatic tire related to embodiments A1 through A30. Detailed structure is as in Table 1.

Here, as shown in Table 1, in the pneumatic tire related to comparative examples A1 and A6, it turned out that it is very difficult to form a concave portion at the time of manufacture. This is based on the following reason. That is, at the time of vulcanization of a manufacture process because width L of a concave portion is less than 0.1 micrometer, for rubber to become difficult to go into the edge of the concave portion of a mold, and it was for the shape of a concave portion not to be prepared. Therefore, when implement ability was taken into consideration, width L of the concave portion needed to be 0.1 micrometers or more.

In addition, thus, when width L of a concave portion is 0.1 micrometers or more, the lower limit of arrangement interval P becomes larger than 0.1 micrometer inevitably. This point is taken into consideration, width L of a concave portion, depth D, and arrangement interval P are set up about the pneumatic tire related to comparative examples A1 through A10, and the pneumatic tire related to embodiments A1 through A30.

TABLE 1

| | Formation of concave portion | Formation point | Width L (μm) | Depth D (μm) | Interval P (μm) | Rotation resistance Index value |
|---|---|---|---|---|---|---|
| Conventional example | nothing | — | — | — | — | 100 |
| Comparative example A1 | occurred | Tire side part | 0.08 | 2 | 1 | Manufacture difficulty |
| Comparative example A2 | occurred | Tire side part | 52 | 9 | 90 | 102 |
| Comparative example A3 | occurred | Tire side part | 1 | 0.08 | 5 | 101 |
| Comparative example A4 | occurred | Tire side part | 9 | 10.5 | 30 | 101 |
| Comparative example A5 | occurred | Tire side part | 4.9 | 9.9 | 100 | 102 |
| Comparative example A6 | occurred | Groove face | 0.08 | 3 | 1 | Manufacture difficulty |
| Comparative example A7 | occurred | Groove face | 51 | 9.9 | 95 | 101 |
| Comparative example A8 | occurred | Groove face | 1 | 0.09 | 2 | 102 |
| Comparative example A9 | occurred | Groove face | 10 | 10.5 | 60 | 101 |
| Comparative example A10 | occurred | Groove face | 50 | 9 | 101 | 102 |
| embodiment A1 | occurred | Tire side part | 0.1 | 0.8 | 0.5 | 108 |
| embodiment A2 | occurred | Tire side part | 2 | 5 | 6 | 109 |
| embodiment A3 | occurred | Tire side part | 5 | 5 | 10 | 110 |
| embodiment A4 | occurred | Tire side part | 10 | 5 | 20 | 108 |
| embodiment A5 | occurred | Tire side part | 49.9 | 9.9 | 90 | 107 |
| embodiment A6 | occurred | Tire side part | 1 | 0.1 | 5 | 110 |
| embodiment A7 | occurred | Tire side part | 3 | 0.5 | 10 | 112 |
| embodiment A8 | occurred | Tire side part | 5 | 1 | 20 | 111 |
| embodiment A9 | occurred | Tire side part | 5 | 2 | 20 | 109 |
| embodiment A10 | occurred | Tire side part | 8 | 9.9 | 20 | 108 |
| embodiment A11 | occurred | Tire side part | 0.1 | 1 | 0.11 | 110 |
| embodiment A12 | occurred | Tire side part | 4 | 4 | 5 | 112 |
| embodiment A13 | occurred | Tire side part | 9 | 4 | 10 | 110 |
| embodiment A14 | occurred | Tire side part | 45 | 9.9 | 50 | 108 |
| embodiment A15 | occurred | Tire side part | 80 | 9.9 | 99.9 | 106 |
| embodiment A16 | occurred | Groove face | 0.1 | 1 | 0.5 | 107 |
| embodiment A17 | occurred | Groove face | 2 | 4 | 6 | 108 |

TABLE 1-continued

| | Formation of concave portion | Formation point | Width L (μm) | Depth D (μm) | Interval P (μm) | Rotation resistance Index value |
|---|---|---|---|---|---|---|
| embodiment A18 | occurred | Groove face | 5 | 4 | 12 | 106 |
| embodiment A19 | occurred | Groove face | 10 | 4 | 30 | 105 |
| embodiment A20 | occurred | Groove face | 49.9 | 9.9 | 70 | 105 |
| embodiment A21 | occurred | Groove face | 0.5 | 0.1 | 2 | 107 |
| embodiment A22 | occurred | Groove face | 0.5 | 0.5 | 2 | 106 |
| embodiment A23 | occurred | Groove face | 3 | 1 | 10 | 106 |
| embodiment A24 | occurred | Groove face | 3 | 2 | 10 | 104 |
| embodiment A25 | occurred | Groove face | 7 | 9.9 | 10 | 104 |
| embodiment A26 | occurred | Groove face | 0.1 | 0.3 | 0.11 | 106 |
| embodiment A27 | occurred | Groove face | 3 | 5 | 5 | 107 |
| embodiment A28 | occurred | Groove face | 6 | 5 | 10 | 105 |
| embodiment A29 | occurred | Groove face | 40 | 9.9 | 50 | 104 |
| embodiment A30 | occurred | Groove face | 50 | 9.9 | 99.9 | 104 |

(1-6.2) Valuation Method

The examination for evaluating rotation resistance was carried out using the pneumatic tire of a conventional example, comparative examples A1 through A10, and embodiments A1 through A30. The evaluation test was measured under the conditions shown below.
<Evaluation Test>
Rim size: Standard rim of JATMA regulation
Internal pressure conditions: 210 kPa
Valuation method: The rotation resistance power of the axle at 80 km/h was measured using the drum test machine provided with a drum 1.7 m in diameter. In addition, measurement of rotation resistance power was measured by a force type based on a method based on ISO18164.

(1-6.3) Evaluation Result

The evaluation result of each pneumatic tire is explained referring to Table 1. In Table 1, the rotation resistance performance shows the measuring result of the tire of a comparative example and an embodiment by the index by making the measurement result of the pneumatic tire related to a conventional example into a standard (100). In addition, In Table 1, it is shown that rotation resistance power is controlled, so that the value of the index shown as rotation resistance performance is large.

It was proved that the tire related to embodiments A1 through A30 can control rotation resistance from the result shown in Table 1 compared with the tire related to a conventional example and comparative examples A1 through A10.

That is, it was proved that rotation resistance can be controlled by the tire about the embodiment which has maximum width L of a concave portion is 0.1 micrometers or more to less than 50 micrometers, depth D is more 0.1 to less than 10 micrometers, and arrangement interval P is less than 100 micrometers more largely than 0.1.

Further, it was proved that rotation resistance can be controlled much more by the tire about the embodiment which has maximum width L of a concave portion is 0.1 micrometers or more to less than 5 micrometers, depth D is more than 0.1 to less than 1 micrometer, and arrangement interval P is less than 10 micrometers more largely than 0.1.

2nd Embodiment

Next, second embodiment of the present invention is described. Although the case where concave portion 80 was formed in some areas on tire surface 50 was mentioned for example in the 1st embodiment mentioned above explained it, convex portion 90 is formed in some areas on tire surface 50 in this embodiment. Below, the structure of pneumatic tire 2 related to this embodiment is explained.

(2-1) Shape and Arrangement of Convex Portion

Figure 7:
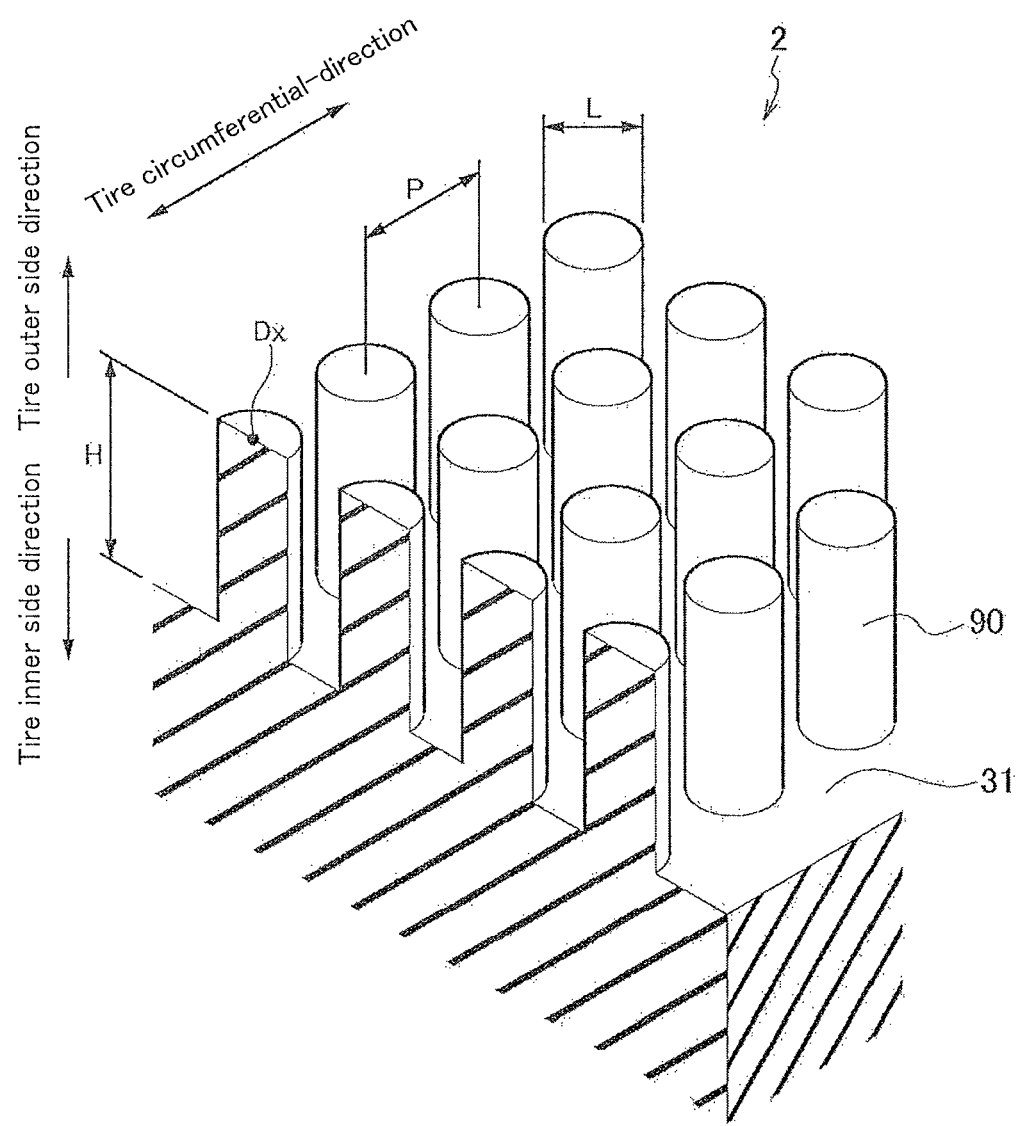
FIG. 7 is an expansion perspective view of tire outer surface 31 of tire side part 30 in which convex portion 90 related to a second embodiment of the present invention is formed.

The expansion perspective view of convex portion 90 formed in pneumatic tire 2 related to this embodiment is shown in FIG. 7.

As shown in the figure, in case tire side surface 31 is seen toward the direction of a tire inner side along with the normal direction of tire side surface 31 (tire surface 50), circle-shaped convex portion 90 is formed in tire side surface 31 with pneumatic tire 2 related to this embodiment.

And, in a case the direction with tire side surface 31 is set as the width direction of convex portion 90, in a direction with tire side surface 31, maximum width L of convex portion 90 is within the range of 0.1 micrometer to less than 50 micrometers. In addition, "a direction with tire side surface 31" can be put in another way as "a direction parallel to tire side surface 31." According to this embodiment, because convex portion 90 is circle shape (the shape of a cylindrical shape), maximum width L of convex portion 90 becomes equal to the diameter of convex portion 90. According to this embodiment, maximum width L of convex portion 90 is set as 0.6 micrometer. Maximum width L of convex portion 90 can use average value Lave of maximum width L of a convex portion. Here, average value Lave is average value of maximum width L of convex portion 90 of plurality (for example, 100 pieces) sampled at random.

In addition, as for maximum width L of convex portion 90, it is more preferred in the above range to be contained in the range of 0.1 micrometer nor more than 5 micrometers. Rubber is hard coming to escape a mold, a convex portion goes out, and maximum width L is not made to the shape considered as the intention, in case a tire falls out from a mold after vulcanization of a manufacture process, when smaller than 0.1 micrometer. When larger than 5 micrometers, thickness sufficient in the convex portion upper part for a buffer layer of maximum width L is lost, and it becomes impossible to reduce frictional resistance with air.

And, height H of convex portion 90 from tire side surface 31 to point Dx positioned in the outermost part of convex portion 90 toward the tire outer side direction is within the range of 0.1 micrometers and less than 10 micrometers. According to this embodiment, height H of convex portion 90 is set as 3 micrometers. In addition, Average value Have of height H of convex portion 90 may be used for height H of convex portion 90. Here, average value Have is average value of height H of the convex portion of plurality (for example, 100 pieces) sampled at random.

Further, the ratio with maximum width L of convex portion 90 may prescribe height H of convex portion 90. Specifically, It may be made for height H of convex portion 90 and maximum width L to satisfy the relation of $0.1<=H/L<=10$. Height H (3 micrometers) of convex portion 90 and maximum width L of convex portion 90 (0.6 micrometer) are prescribed to H/L=5 by this embodiment.

In addition, in the range which satisfies the above relation, as for height H of convex portion 90, it is more preferred to be included in the range of 0.1 micrometer nor more than 1 micrometer. Because height H of convex portion 90 has large creep modification of rubber in the area exposed to high temperature when smaller than 0.1 micrometer, the shape modifies largely and an effect decreases. Because in height H of convex portion 90 rubber does not enter easily at the time of vulcanization when larger than 1 micrometer, the shape of convex portion 90 is not easily prepared.

Moreover, in the direction along with tire side surface 31, arrangement interval P of convex portion 90 is within the range of 0.1 micrometer or more to less than 100 micrometers. Arrangement interval P means the distance of the center of convex portion 90, and the center of other convex portions 90 which adjoin most close. According to this embodiment, arrangement interval P of convex portion 90 is set to 0.66 micrometer. Arrangement interval P of convex portion 90 may use average value Pave of arrangement interval P of convex portion 90. Here, average value Pave is average value of the distance between convex portions 90 of plurality (for example, 100 pieces) sampled at random (between centers).

Further, arrangement interval P of convex portion 90 may be made to be prescribed by the ratio with width L of convex portion 90. Are concrete, It may be made to satisfy the relation of $1.05<=P/L<=5$ as arrangement interval P of convex portion 90, and maximum width L of convex portion 90. As arrangement interval P of convex portion 90 (0.66 micrometer), and maximum width L of convex portion 90 (0.6 micrometer), it is prescribed to P/L=1.1 by this embodiment.

In addition, as for arrangement interval P of convex portion 90, in the range which satisfies the relation mentioned above, it is more preferred to be included in the range of 0.1 micrometer or more to 5 micrometers or less. In arrangement interval P, when smaller than 0.1 micrometer, rubber cannot go into an edge easily, and shape is not easily prepared. Because the tensile strain on which arrangement interval P works between convex portions 90 when larger than 5 micrometers becomes large, convex portion 90 cannot escape from a mold easily in the case of vulcanization, and it becomes that it is easy to be cut.

(2-2) Structure of Mold

Figure 8:
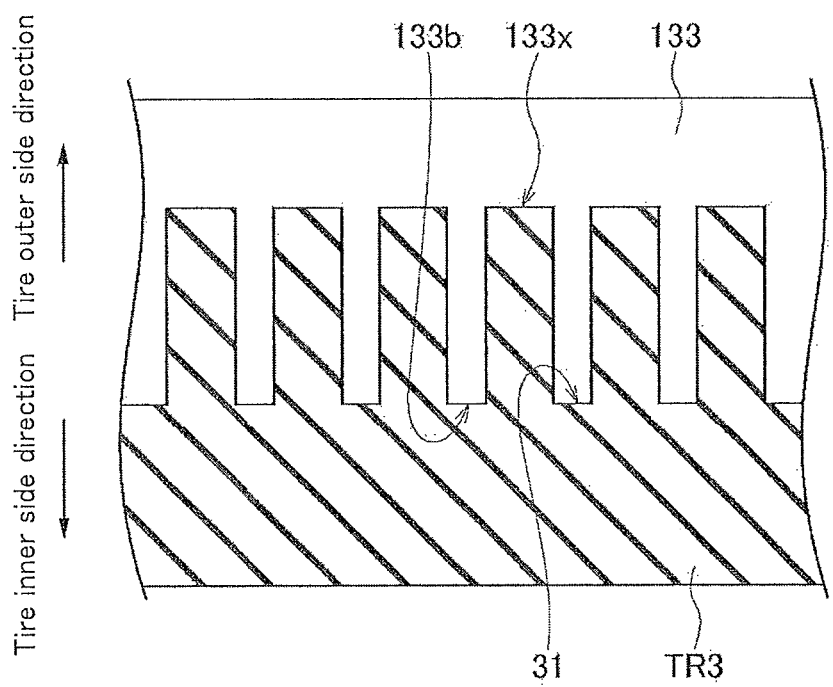
FIG. 8 is an expanded sectional view showing the convex formation part of the upper part side mold related to a second embodiment of the present invention.

Next, with reference to drawings, the structure of the side mold related to this embodiment is explained. In the upper part side mold related to this embodiment, FIG. 8 is an expanded sectional view showing the tire width direction section of the convex formation part which forms convex portion 90.

As shown in the figure, the convex formation part for molding convex portion 90 is formed in the sidewall formation surface and tire side surface 31 for molding tire side surface 31 of the sidewall part of tire TR at the inner skin of the mold. Specifically, from the sidewall formation surface, towards the tire outer side direction, a convex formation part is dented and is formed.

And a convex formation part is formed in the inner skin of an upper part side mold by laser processing.

(2-3) Operation and Effect

Also in pneumatic tire 2 related to this embodiment, because said convex portion 90 is arranged regularly, in case pneumatic tire 2 rotates, the optimal relief layer with air can be formed. That is, according to pneumatic tire 2 related to this embodiment, the rotation resistance of a tire can be controlled further.

(2-4) Modification

Next, the Modification related to 2nd embodiment is explained.

(2-4.1) Modification 1

In addition, although the embodiment mentioned above explained the case where some areas on tire surface 50 in which convex portion 90 is formed were set as tire side surface 31, for the example, as this area, it may be an area of a pair of groove wall surfaces 11a, or groove bottom surface 11b in which either is formed at least. In this case, because convex portion 90 is not easily worn out compared with the case where it is formed in the ground contact surface 42 of tread part 40, the rotation resistance of a tire can be controlled over a long time.

And some areas on tire surface 50 formed convex portion 90 may be areas in which any one field formed tire side surface 31, a pair of groove wall surfaces 11a, or groove bottom surfaces 11b, and may be areas in which all these fields are formed.

(2-4.2) Modification 2

Next, modification 2 related to 2nd embodiment is explained. Here, the structure of convex portion 90 is not limited to the structure of convex portion 90 related to the 2nd embodiment. Below, other structures of convex portion 90 are explained.

For example, in the embodiment mentioned above, in case tire side surface 31 was seen toward the direction of a tire inner side, convex portion 90 was formed in circle shape, but convex portion 90 may be rectangular form.

Figure 9:
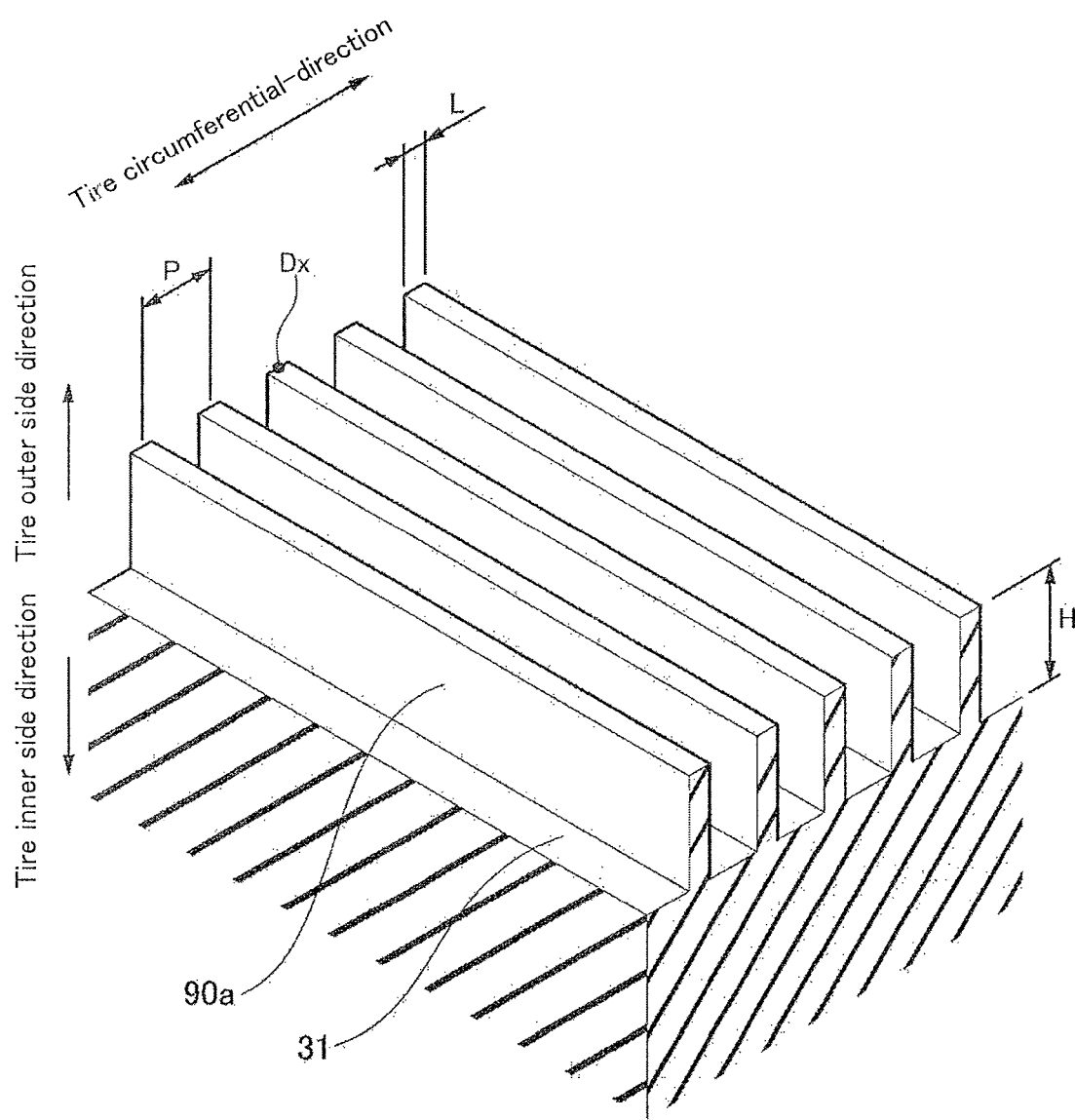
FIG. 9 is an expanded sectional view shows an example of convex portion 90 concerning a modification of the present invention.

In FIG. 9, an example of convex portion 90a related to this modification is shown. As shown in the figure, in case tire side surface 31 is watched toward the direction of a tire inner side, convex portion 90a is formed in rectangular form.

And, in this case, as for maximum width L of convex portion 90a, it is preferred to set it as 1 micrometer. As for height H of convex portion 90a, it is preferred to set it as 5 micrometers, as for arrangement interval P of convex portion 90a, it is preferred to set it as 3 micrometers.

(2-4.3) Modification 3

Figure 10:
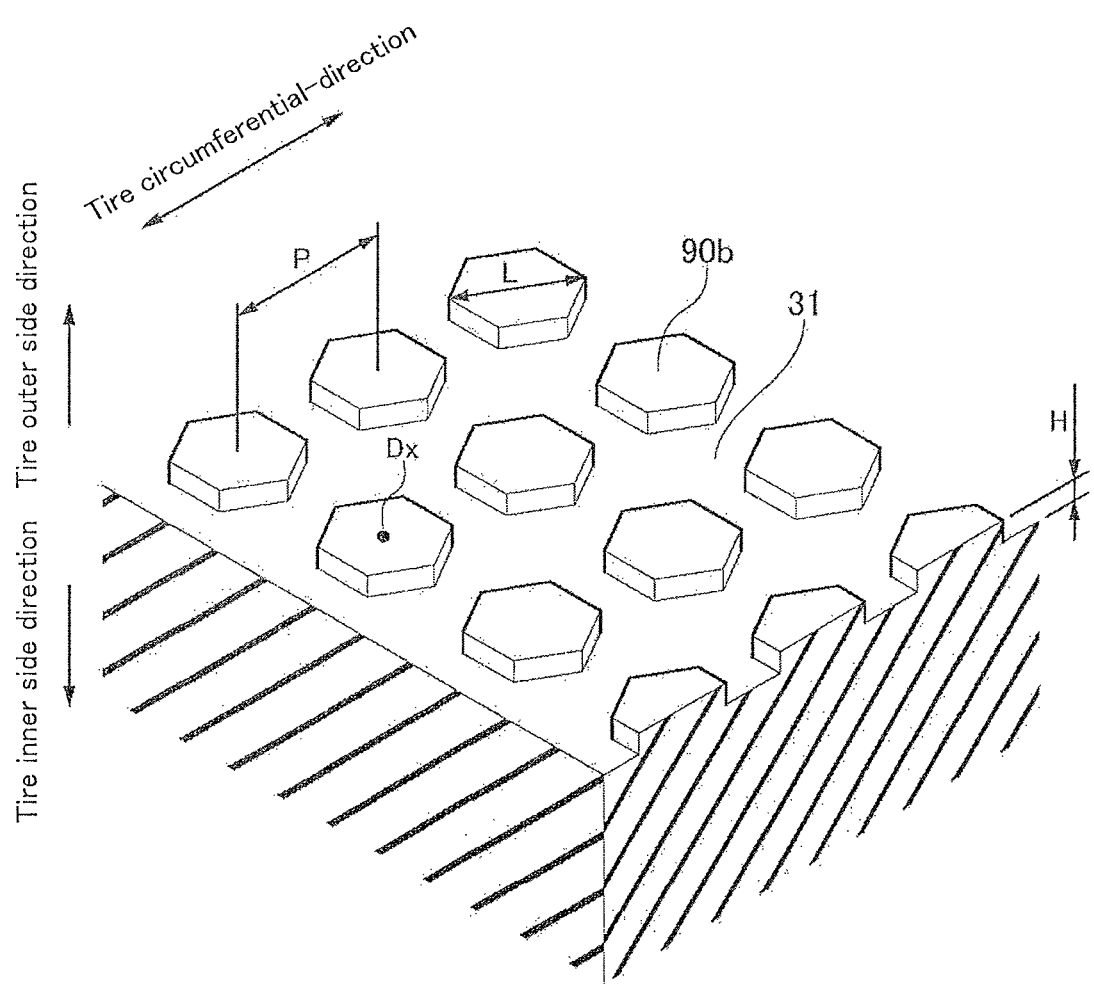
FIG. 10 is a partial perspective view showing an example of convex portion 90 related to a modification of the present invention.

And, an example of other convex portion 90b related to Modification 3 is shown in FIG. 10. As shown in the figure, in case tire side surface 31 was watched toward the direction of a tire inner side, convex portion 90 was formed in circle shape, but convex portion 90b is formed in polyhedron shape (in the example shown in FIG. 10, it is the shape of a right hexagon).

And, in this case, it is preferred to set maximum width L of convex portion 90b as 0.5 micrometers. As for height H of convex portion 90b, it is preferred to set it as 0.1 micrometer. As for arrangement interval P of convex portion 90b, it is preferred to set it as 1.5 micrometers.

(2-4.4) Modification 4

Figure 11:
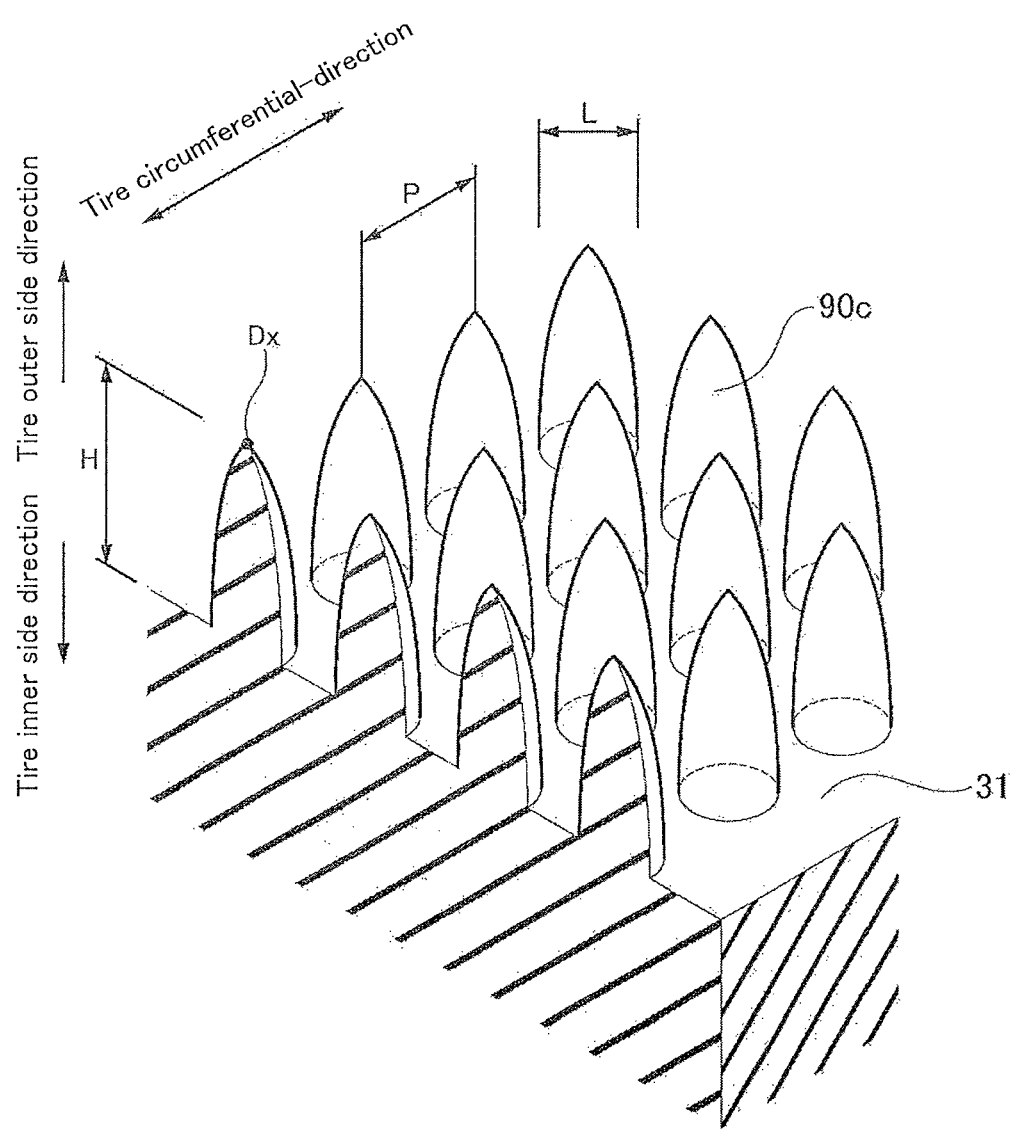
FIG. 11 is a partial perspective view showing an example of convex portion 90 related to a modification of the present invention.

And, in FIG. 11, an example of other convex portion 90c related to Modification 4 is shown. As shown in the figure, convex portion 90c is formed so that it may taper off to tapered shape, as it goes in the tire outer side direction along with the normal direction of tire side surface 31. In case convex portion 90c watches tire side surface 31 toward the direction of a tire inner side along with the normal direction of tire side surface 31, it is formed in circle shape.

And, in this case, it is preferred to set maximum width L of convex portion 90c as 4 micrometers. As for height H of convex portion 90c, it is preferred to set it as 9 micrometers. As for arrangement interval P of convex portion 90c, it is preferred to set it as 20 micrometers.

As mentioned above, in pneumatic tire 2 related to this modification, in arranging regularly said convex portions 90a through 90c, in case pneumatic tire 2 rotates, the relief layer of the optimal air can be formed. That is, according to pneumatic tire 2 related to this modification, the rotation resistance of a tire can be controlled further.

(2-5) Comparative Evaluation

Next, in order to clarify the effect of the present invention further, the comparative evaluation using the pneumatic tire related to the following comparative examples and embodiments is explained. The present invention is not limited at all by these examples.

(2-5.1) Explanation of Comparative Example and Embodiments

In order to evaluate the performance of the rotation resistance for the pneumatic tire which has a convex portion, the following comparative evaluation was carried out. Specifically, the following conventional example, comparative examples B1 through B10, and embodiments B1 through B30 were prepared. It is explained using Table 2.

In addition, the sizes of the tire used as a pneumatic tire for a conventional example, a comparative example, and an embodiment are 155/65R13. And Except the structure shown below, other structures are the same structures in a conventional example, a comparative example, and an embodiment.

First, the pneumatic tire related to a conventional example is explained. That by which the convex portion is not formed in the tire surface was used for the pneumatic tire related to a conventional example.

Next, the pneumatic tire related to a comparative example and the pneumatic tire related to an embodiment are explained. That in which the convex portion is formed was used for a pair of groove wall surfaces in a tire side part or a tread part for a pneumatic tire related to the pneumatic tire, embodiment B1, or B2 related to comparative examples B1 through B10. Detailed structure is as in Table 2.

Here, as shown in Table 2, in the pneumatic tire related to comparative example B1 and B6, it turned out that it is very difficult to form a convex portion at the time of manufacture. This is based on the following reason. That is, it was because width L of a convex portion is less than 0.1 micrometer, so rubber cannot go into the edge of the concave portion of a mold easily and the shape of a convex portion is not prepared at the time of vulcanization of a manufacture process. Therefore, when implement ability was taken into consideration, width L of the convex portion needed to be 0.1 micrometers or more.

In addition, thus, when width L of a convex portion is 0.1 micrometers or more, the lower limit of arrangement interval P turns into a larger value than 0.1 micrometer inevitably. In the pneumatic tire applied to comparative examples B1 through B10 in consideration of this point, and the pneumatic tire related to embodiments B1 through B30, width L of a convex portion, depth D, and arrangement interval P are set up.

TABLE 2

|  | Formation of convex portion | Formation point | Width L (μm) | Height H (μm) | Interval P (μm) | Rotation resistance Index value |
|---|---|---|---|---|---|---|
| Conventional example | nothing | — | — | — | — | 100 |
| Comparative example B1 | occurred | Tire side part | 0.09 | 0.1 | 0.5 | Manufacture difficulty |
| Comparative example B2 | occurred | Tire side part | 50.1 | 9.9 | 90 | 102 |
| Comparative example B3 | occurred | Tire side part | 1 | 0.08 | 2 | 102 |
| Comparative example B4 | occurred | Tire side part | 0.8 | 10 | 1 | 102 |
| Comparative example B5 | occurred | Tire side part | 40 | 9.9 | 101 | 102 |
| Comparative example B6 | occurred | Groove face | 0.08 | 0.5 | 0.4 | Manufacture difficulty |
| Comparative example B7 | occurred | Groove face | 50.5 | 9.9 | 80 | 101 |
| Comparative example B8 | occurred | Groove face | 0.3 | 0.09 | 1 | 101 |
| Comparative example B9 | occurred | Groove face | 10 | 10.1 | 15 | 102 |
| Comparative example B10 | occurred | Groove face | 45 | 9 | 100.5 | 102 |
| embodiment B1 | occurred | Tire side part | 0.1 | 0.7 | 0.5 | 110 |
| embodiment B2 | occurred | Tire side part | 2 | 4 | 4 | 111 |
| embodiment B3 | occurred | Tire side part | 5 | 4 | 10 | 113 |
| embodiment B4 | occurred | Tire side part | 10 | 9.9 | 15 | 108 |
| embodiment B5 | occurred | Tire side part | 49 | 9.9 | 80 | 107 |
| embodiment B6 | occurred | Tire side part | 0.15 | 0.1 | 0.7 | 111 |
| embodiment B7 | occurred | Tire side part | 0.6 | 0.5 | 1 | 113 |
| embodiment B8 | occurred | Tire side part | 2 | 1 | 3 | 112 |
| embodiment B9 | occurred | Tire side part | 3 | 2 | 5 | 108 |
| embodiment B10 | occurred | Tire side part | 5 | 9.9 | 20 | 108 |
| embodiment B11 | occurred | Tire side part | 0.1 | 0.7 | 0.11 | 112 |

TABLE 2-continued

| | Formation of convex portion | Formation point | Width L (μm) | Height H (μm) | Interval P (μm) | Rotation resistance Index value |
|---|---|---|---|---|---|---|
| embodiment B12 | occurred | Tire side part | 0.8 | 5 | 2 | 111 |
| embodiment B13 | occurred | Tire side part | 4 | 6 | 5 | 111 |
| embodiment B14 | occurred | Tire side part | 30 | 9.9 | 60 | 108 |
| embodiment B15 | occurred | Tire side part | 40 | 9.9 | 99.9 | 108 |
| embodiment B16 | occurred | Groove face | 0.1 | 0.6 | 0.11 | 109 |
| embodiment B17 | occurred | Groove face | 2 | 10 | 5 | 110 |
| embodiment B18 | occurred | Groove face | 5 | 8 | 10 | 108 |
| embodiment B19 | occurred | Groove face | 10 | 9.9 | 30 | 105 |
| embodiment B20 | occurred | Groove face | 49.9 | 8 | 65 | 106 |
| embodiment B21 | occurred | Groove face | 0.1 | 0.1 | 0.49 | 108 |
| embodiment B22 | occurred | Groove face | 1 | 0.5 | 1.5 | 107 |
| embodiment B23 | occurred | Groove face | 3 | 1 | 5 | 108 |
| embodiment B24 | occurred | Groove face | 5 | 2 | 10 | 105 |
| embodiment B25 | occurred | Groove face | 40 | 9.9 | 60 | 105 |
| embodiment B26 | occurred | Groove face | 0.1 | 0.5 | 0.11 | 110 |
| embodiment B27 | occurred | Groove face | 1 | 5 | 1.05 | 111 |
| embodiment B28 | occurred | Groove face | 3 | 1 | 5 | 109 |
| embodiment B29 | occurred | Groove face | 40 | 9.9 | 60 | 106 |
| embodiment B30 | occurred | Groove face | 49 | 9 | 99.9 | 106 |

(2-5.2) Valuation Method

The examination for evaluating rotation resistance was carried out using the pneumatic tire of a conventional example, comparative examples B1 through B10, and embodiments B1 through B30. The evaluation test was measured on the conditions shown below.
<Evaluation Test>
Rim size: Standard rim of JATMA regulation
Internal pressure conditions: 210 kPa
Valuation method: The rotation resistance power of the axle at 80 km/h was measured using the drum test machine provided with a drum 1.7 m in diameter. The measurement of rotation resistance power was measured by the force type based on the method based on ISO18164.

(2-5.3) Evaluation Result

The evaluation result of each pneumatic tire is explained referring to Table 2. In Table 2, the rotation resistance performance shows the measuring result of the tire of a comparative example and an embodiment by the index by making the measurement result of the pneumatic tire related to a conventional example into a standard (100). In Table 2, it is shown that rotation resistance power is controlled, so that the value of the index shown as rotation resistance performance is large.

From the result shown in Table 2, it was proved that the tire related to embodiments B1 through B30 can control rotation resistance compared with the tire related to a conventional example and comparative examples B1 through B10.

That is, maximum width L of a convex portion is 0.1 micrometers or more less than 50 micrometers, height H is 0.1 micrometers or more less than 10 micrometers, and, as for arrangement interval P, it was proved that the tire related to the embodiment which is less than 100 micrometers more largely than 0.1 micrometer can control rotation resistance.

Further, it was proved that rotation resistance can control further by a tire as for the embodiment having a maximum width L of a convex portion is 0.1 micrometers or more less than 5 micrometers, a height H is 0.1 micrometers or more less than 1 micrometer, and, an arrangement interval P which is less than 5 micrometers more largely than 0.1 micrometer.

3rd Embodiment

In the following, 3rd embodiment is described.

An feature of the tire (pneumatic tire 1) related to a 3rd embodiment is summarized as a tire having a rim contact surface (rim contact surface 21) contacts a regular rim when a regular rim (regular rim 19) is equipped, wherein in at least some areas of the rim contact surface, the convex portion (convex portion 90) projected toward the tire outer side direction from the rim contact surface is arranged regularly, in the direction along with the rim contact surface, a maximum width L of the convex portion is within the range of 0.1 micrometers or more to less than 50 micrometers, a height H of the convex portion from the rim contact surface to the point positioned in the outermost part of the convex portion toward the tire outer side direction is within a range of 0.1 micrometers or more to less than 10 micrometers, in the direction along with the rim contact surface, arrangement interval P of the convex portion is within the range of 50 micrometers and under more largely than 0.1 micrometer.

In this tire, the convex portion is regularly arranged to at least some areas of the rim contact surface. Maximum width L of a convex portion is within the range of 0.1 micrometers or more to less than 50 micrometers, height H of a convex portion is within the range of 0.1 micrometers or more to less than 10 micrometers. Arrangement interval P of a convex portion is within the range no more than 50 micrometers and more largely than 0.1 micrometer.

Because such a convex portion of shape and an arrangement interval can enter certainly by depression and projection on the surface of a rim of a regular rim compared with the convex portion formed by conventional technology, it can make large more contact area of a regular rim and a bead part. According to such a tire, while the Van der Waals force on a rim contact surface and the surface of a rim increases, the frictional force of a bead part and a regular rim can be improved.

Therefore, in a tire, even if it makes small area of a rim contact surface with a regular rim compared with the tire related to conventional technology, the volume of slides of a tire and a regular rim can be controlled more. That is, in a tire, because it becomes possible to control the volume of slides of a tire and a regular rim even if it makes thin thickness of the tread width direction of a bead part, thickness of a bead part can be made thin.

Thus, because the volume of slides of a tire and a regular rim can be controlled more according to this tire 1, the thickness of a bead part can be contributed to the weight saving of the tire weight by making it thin.

(3-1) Shape and Arrangement of Convex Portion

In pneumatic tire 1 related to a third embodiment, in case rim contact surface 21 is watched to a normal direction, circle-shaped convex portion 90 is formed in rim contact surface 21.

In the direction along with rim contact surface 21, maximum width L of convex portion 90 is within the range of 0.1 micrometers or more to less than 50 micrometers. It can be put in another way as "a direction along to rim contact surface 21" with "the direction parallel with rim contact surface 21." According to this embodiment, because convex portion 90 is circle shape (the shape of a cylindrical shape), maximum width L of convex portion 90 becomes equal to the diameter of convex portion 90. According to this embodiment, maximum width L of convex portion 90 is set as 0.4 micrometer. Maximum width L of convex portion 90 may use average value Lave of maximum width L of a convex portion. Here, average value Lave is average value of maximum width L of convex portion 90 of plurality (for example, 100 pieces) sampled at random.

In addition, as for maximum width L of convex portion 90, it is more preferred that it is not less than 0.1 micrometer nor more than 5 micrometers in the range mentioned above. Rubber cannot escape from a mold easily, minute convex portion 90 cuts, and maximum width L is not made to the shape considered as purpose, in case a tire falls out from a mold after vulcanization of a manufacture process, when smaller than 0.1 micrometer. In cases where the maximum width L is larger than 5 micrometers on the one side, if equipping the rim with the tire, it is caught and the shape collapses.

And height H of convex portion 90 from rim contact surface 21 to point DZ of being positioned in the outermost part of convex portion 90 toward the tire outer side direction is within the range of 0.1 micrometers or more to less than 10 micrometers. According to this embodiment, height H of convex portion 90 is set as 2 micrometers. Average value Have of height H of convex portion 90 may be used for height H of convex portion 90. Here, average value Have is average value of height H of the convex portion of plurality (for example, 100 pieces) sampled at random.

Further, a ratio with maximum width L of convex portion 90 may prescribe height H of convex portion 90. Specifically, It may be made for height H of convex portion 90 and maximum width L to satisfy the relation of 0.1<=H/L<=10. In this embodiment, height H (2 micrometers) of convex portion 90 and maximum width L of convex portion 90 (0.4 micrometer) are specified by H/L=5.

In addition, as for height H of convex portion 90, in the range which satisfies the relation mentioned above, it is more preferred to be included in the range of 0.1 micrometer nor more than 5 micrometers. Because height H of convex portion 90 has large creep modification of rubber in the area exposed to high temperature when smaller than 0.1 micrometer, it changes shape largely and an effect reduces it. Because rubber becomes difficult for height H of convex portion 90 to enter at the time of vulcanization when larger than 5 micrometers, the shape of convex portion 90 becomes difficult to be prepared.

And, in the direction along with rim contact side 21, arrangement interval P of convex portion 90 is within the range no more than 50 micrometers and more largely than 0.1 micrometer. Arrangement interval P means the distance of the center of convex portion 90, and the center of other convex portions 90 which adjoin most close. According to this embodiment, arrangement interval P of convex portion 90 is set as 0.8 micrometer. In addition, as arrangement interval P of convex portion 90, average value Pave of arrangement interval P of convex portion 90 may be used. Here, average value Pave is average value of the distance between convex portions 90 of plurality (for example, 100 pieces) sampled at random (between centers).

Further, arrangement interval P of convex portion 90 may be made to be prescribed by the ratio with width L of convex portion 90. Specifically, As for arrangement interval P of convex portion 90, and maximum width L of convex portion 90, it is preferred to satisfy the relation of 1.0<P/L, and it may be made to satisfy the relation of 1.05<=P/L<=10 especially. Arrangement interval P of convex portion 90 (0.8 micrometer) and maximum width L of convex portion 90 (0.4 micrometer) are prescribed to the relation of P/L=2 by this embodiment.

In addition, as for average value Pave of arrangement interval P of convex portion 90, it is more preferred to be included in the range more largely than 0.1 micrometer nor more than 5 micrometers and in the range which satisfies the relation mentioned above. When arrangement interval P is 0.1 micrometer and under, shape of convex portion 90 cannot be prepared. Because arrangement interval P becomes large in the tensile strain which works between convex portions 90 when larger than 5 micrometers, convex portion 90 cuts easily at the time of vulcanization, without escaping from mold.

(3-2) Operation and Effect

Because such a convex portion 90 of shape and an arrangement interval can enter certainly compared with the convex portion formed by conventional technology by depression and projection on the surface of a rim of regular rim 19, it can make large more contact area of regular rim 19 and bead part 20. According to such a pneumatic tire 1, while the Van der Waals force on rim contact surface 21 and the surface of a rim increases, the frictional force of bead part 20 and regular rim 19 can be improved.

Therefore, in pneumatic tire 1 related to this embodiment, even if it makes small area of rim contact surface 21 with regular rim 19 compared with pneumatic tire 1 related to conventional technology, it becomes possible to control more the volume of slides of pneumatic tire 1 and regular rim 19.

(3-3) Modification

Next, the Modification related to 3rd embodiment is explained. The structure of convex portion 90 is not limited to the structure of convex portion 90 related to a 3rd embodiment. Below, the structure of other convex portions 90 is explained.

(3-3.1) Modification 1

For example, in the embodiment mentioned above, in case rim contact surface 21 is watched toward the direction of a tire inner side along with the normal direction of rim contact surface 21, it is formed in rectangular form.

And, in this case, as for maximum width L of convex portion 90, it is preferred to set it as 0.5 micrometers. As for height H of convex portion 90, being referred to as 2.5 micrometers is preferred, and, as for arrangement interval P of convex portion 90a, it is preferred to set it as 2.5 micrometers.

(3-3.2) Modification 2

In case rim contact surface 21 was watched toward the direction of a tire inner side along with the normal direction of rim contact surface 21, convex portion 90 was formed in circle shape, but convex portion 90 may be formed in polyhedron shape (the shape of for example, a right hexagon).

And, in this case, it is preferred that maximum width L of convex portion 90 shall be 5 micrometers in this case. As for height H of convex portion 90b, being referred to as 0.5 micrometers is preferred. As for arrangement interval P of convex portion 90, being referred to as 10 micrometers is preferred.

(3-3.3) Modification 3

About the convex portion 90, the direction which the convex portion 90 stand outs is made, in order that it may tilt over to the normal direction of the rim contact surface 21.

And, in this case, as for maximum width L of convex portion 90, it is preferred to set it as 2 micrometers. As for height H of convex portion 90, it is preferred to set it as 9 micrometers. As for arrangement interval P of convex portion 90, being referred to as 4 micrometers is preferred.

As mentioned above, according to pneumatic tire 1 related to this modification, it becomes possible in arranging regularly said convex portions 90a through 90c to control the volume of slides of pneumatic tire 1 and rim 19. That is, because the volume of slides of pneumatic tire 1 and regular rim 19 can be controlled more according to pneumatic tire 1 related to this modification, the thickness of bead part 20 can be contributed to the weight saving of the tire weight by making it thin.

(3-4) Comparative Evaluation

Next, in order to clarify the effect of the present invention further, the comparative evaluation performed using the pneumatic tire related to the following comparative examples and embodiments is explained. The present invention is not limited at all by these examples.

(3-4.1) Explanation of Comparative Example and Embodiment

In order to evaluate the maintenance performance of the pneumatic tire and regular rim 19 which have a convex portion, the following comparative evaluation was carried out. Specifically, the following conventional example, comparative example A3-1 through A3-5, and embodiment A3-1 through A3-15 was prepared. It explains using Table 3.

In addition, that whose tire sizes are 155/65R13 was used for the pneumatic tire concerning a conventional example, a comparative example, and an embodiment. Other structures are the same structures in a conventional example, a comparative example, and an embodiment except the structure shown below.

First, the pneumatic tire related to a conventional example is explained. As a pneumatic tire related to a conventional example, the tire by which the convex portion is not formed in rim contact surface 21 of bead part 20 was used.

Next, the pneumatic tire related to a comparative example and the pneumatic tire related to an embodiment are explained. That by which the convex portion is formed in rim contact surface 21 of bead part 20 was used for each of pneumatic tires related to comparative example A3-1 through A3-5, and pneumatic tires related to embodiment A3-1 through A3-15. Detailed structure is as in Table 3.

Here, as shown in Table 3, in the pneumatic tire related to comparative example A3-1, it turned out that it is very difficult to form a convex portion at the time of manufacture. This is based on the following reason. That is, at the time of vulcanization of a manufacture process because width L of a convex portion is less than 0.1 micrometer, for rubber to be unable to go into the edge of the concave portion of a mold easily, and it was for the shape of a convex portion not to be prepared. Therefore, when implement ability was taken into consideration, width L of the convex portion needed to be not less than 0.1 micrometers.

In addition, thus, when width L of a convex portion is not less than 0.1 micrometers, the lower limit of arrangement interval P turns into a larger value than 0.1 micrometer inevitably. In the pneumatic tire applied to comparative example A3-1 through A3-5 in consideration of this point, and the pneumatic tire related to embodiment A3-1 through A3-15, width L of a convex portion, depth D, and arrangement interval P are set up.

TABLE 3

| | Formation of convex portion | Width L (μm) | Height H (μm) | Interval P (μm) | retaining performance |
|---|---|---|---|---|---|
| Comparative example | nothing | — | — | — | 1.0 |
| comparative example A3-1 | occurred | 0.09 | 0.2 | 0.4 | Manufacture difficulty |
| comparative example A3-2 | occurred | 50 | 30 | 50.1 | 1.02 |
| comparative example A3-3 | occurred | 0.1 | 0.09 | 0.5 | 1.01 |
| comparative example A3-4 | occurred | 5 | 10 | 13 | 1.01 |
| comparative example A3-5 | occurred | 25 | 9.9 | 50.1 | 1.02 |
| embodiment A3-1 | occurred | 0.1 | 0.5 | 0.2 | 1.07 |
| embodiment A3-2 | occurred | 2 | 1 | 3 | 1.08 |
| embodiment A3-3 | occurred | 5 | 20 | 10 | 1.07 |
| embodiment A3-4 | occurred | 10 | 10 | 40 | 1.05 |
| embodiment A3-5 | occurred | 49 | 9.9 | 50 | 1.04 |
| embodiment A3-6 | occurred | 0.4 | 0.1 | 0.6 | 1.09 |
| embodiment A3-7 | occurred | 0.2 | 0.5 | 0.4 | 1.08 |
| embodiment A3-8 | occurred | 2 | 1 | 12 | 1.07 |
| embodiment A3-9 | occurred | 0.25 | 2 | 2.5 | 1.05 |
| embodiment A3-10 | occurred | 4 | 9.9 | 20 | 1.05 |
| embodiment A3-11 | occurred | 0.1 | 0.5 | 0.11 | 1.09 |
| embodiment A3-12 | occurred | 0.25 | 2 | 2 | 1.08 |
| embodiment A3-13 | occurred | 3 | 5 | 5 | 1.08 |
| embodiment A3-14 | occurred | 5 | 2.5 | 10 | 1.05 |
| embodiment A3-15 | occurred | 46 | 9.9 | 49 | 1.04 |

(3-4.2) Valuation Method

The examination for evaluating maintenance performance was carried out using the pneumatic tire of conventional example and comparative example A3-1 through A3-5, embodiment A3-1 to A3-15. The evaluation test was measured on the conditions shown below.

<Evaluation Test>

Rim size: Standard rim of JATMA regulation
Internal pressure conditions: 210 kPa
Loading condition: Load of adult male entrainment
Valuation method: Marking (for example, using chalk the position of a tire and a regular rim marking) of the position of a tire and a regular rim was carried out for each tire and a regular rim behind the rim group. After making it run each tire 20,000 km at a speed of 60 km/h, the volume of gaps of a tire and a regular rim was measured.

(3-4.3) Evaluation Result

The evaluation result of each pneumatic tire is explained referring to Table 3. In Table 3, the maintenance performance shows the measuring result of the tire of a comparative example and an embodiment by the index by making the measurement result of the pneumatic tire related to a conventional example into a standard (1.0). In Table 3, it is shown that the maintenance performance is excellent, so that the value of the index shown as maintenance performance is large.

From the result shown in Table 3, it was proved that the tire related to embodiment A3-1 through A3-15 is excellent in the maintenance performance compared with the tire related to conventional example and comparative example A3-1 through A3-5.

That is, maximum width L of a convex portion is not less than 0.1 micrometer to less than 50 micrometers, height H is not less than 0.1 micrometers to less than 10 micrometers, and, as for the tire which requires arrangement interval P for the embodiment which is no more than 50 micrometers and more largely than 0.1 micrometer, it was proved that the maintenance performance of a tire and a regular rim is excellent. Therefore, because it was proved that maintenance performance is securable even if it made thickness of bead part 20 thin, it was proved by making thickness of bead part 20 thin that the weight saving of tire weight can be attained.

Further, Maximum width L of a convex portion is not less than 0.1 micrometer to less than 5 micrometers, height H is not less than 0.1 micrometers to less than 1 micrometer, and, as for the tire which requires arrangement interval P for the embodiment which is no more than 5 micrometers and more largely than 0.1 micrometer, it was proved that the maintenance performance is further excellent.

4th Embodiment

In the following, 4th embodiment is explained.

A feature of the pneumatic tire related to a 4th embodiment is a pneumatic tire having a tread portion in which a land part is placed, wherein in the top surface of the land part, many minute convex portions or concave portions are placed with space between each of them, the height of the minute convex portion or the depth of the concave portion is not less than 0.1 micrometer to less than 5 micrometers.

Because the height of a minute convex portion or the depth of the concave portion is not less than 0.1 micrometer to less than 5 micrometers according to this invention, When driving on a snow-and-ice road surface, it is possible to put the minute convex portion of the top surface of the land part into the pit formed on the snow-and-ice road surface, or it is possible to put the projection formed on the snow-and-ice road surface into the concave portion in the top surface of a land part, in these results, distance between the top surface of the land part and the snow-and-ice road surface is shortened, and it becomes easy to make these both sides close. Thereby, it becomes possible to heighten the Van der Waals force of the land part and the snow-and-ice road surface, and it can improve the braking ability on the snow-and-ice road surface over a long time.

Moreover the pitch between the adjacent minute convex portions or the pitch between the adjacent concave portions may be not less than 0.1 micrometer to less than 1000 micrometers.

In this case, because the pitch between adjacent minute convex portions or the pitch between adjacent concave portions is not less than 0.1 micrometer to less than 1000 micrometers, the Van der Waals force of the land part and the snow-and-ice road surface is increased further.

(4-1) Shape and Arrangement of Convex Portion

Pneumatic tire 1 related to 4th embodiment has the land part divided by the circumferential groove and transverse groove which were placed in the tread portion. The siping which extends along tread width direction Tw is formed in the land part. In addition, the siping means the rill of the flute width blockaded in the ground contact surface in the condition that the par rim was equipped with the pneumatic tire 1, and this pneumatic tire 1 was filled up with prescribed inner pressure as mentioned above, and maximum load capacity was applied to it.

Figure 3:
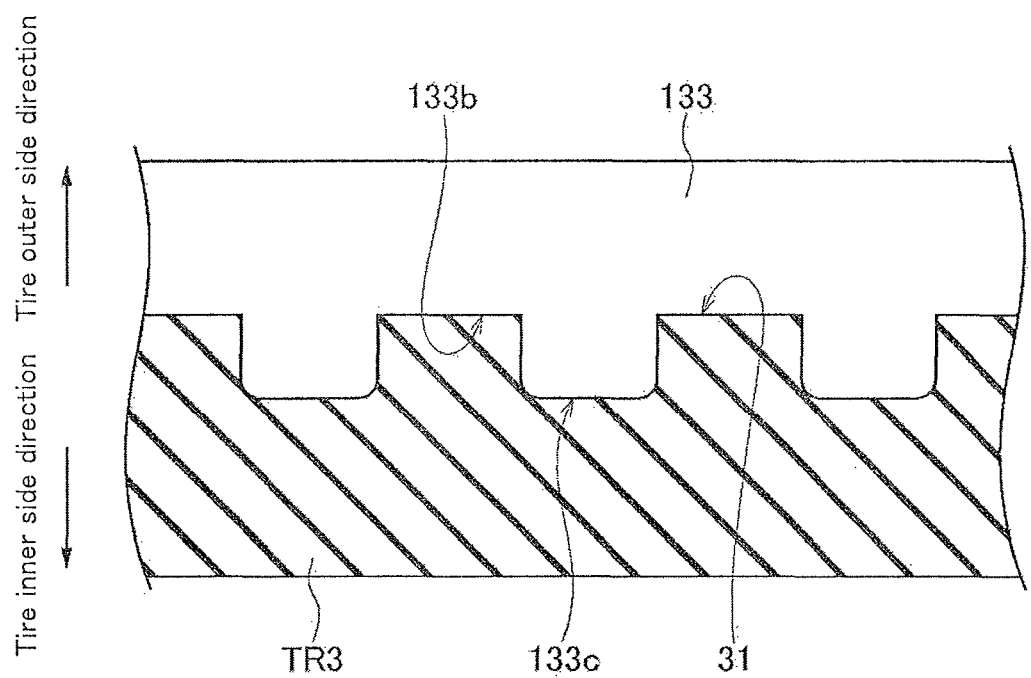
FIG. 3 is an expanded sectional view showing the concave formation part of the upper part side mold related to the 1st embodiment of the present invention.

As shown in FIG. 3 here, many convex portions 90 are placed in the top surface of the land part with space. Convex portion 90 protrudes toward the outside of tire diameter direction R from the top surface, and many convex portions 90 are formed in same shape and same size with each other. Convex portion 90 was formed cylindrical and the end face of convex portion 90 has extended over the top surface of a land part in the example of illustration. Convex portion 90 protrudes along tire diameter direction R, and center line O1 of convex portion 90 has extended along tire diameter direction R. In addition, for example, outer diameter L1 of convex portion 90 may be set as not less than 0.1 micrometer to less than 100 micrometers, preferably may be set not less than 0.5 micrometers to less than 100 micrometers.

Many convex portions 90 are regularly allocated so that pitch P between adjacent convex portions 90, i.e., the interval of center line O1 comrades of adjacent convex portion 90, may become equivalent mutually. In the example of illustration, Many convex portions 90 open the same space as one direction D1 in alignment with the top surface of land part 18, and are arranged, comprise a convex portion line which extends along with the one direction D1, This convex portion line opens the same space as other directions D2 which intersect perpendicularly in the one direction D1 over the top surface, and is arranged. And pitch P between convex portions 90 adjacent along with the one direction D1, and direction D2 besides the above is equivalent with each other, and suits, Pitch P between adjacent convex portions 90 are not less than 0.1 micrometers to less than 1000 micrometers, or are not less than 0.3 micrometers to less than 100 micrometers preferably. Pitch P between adjacent convex portions 90 may not be equivalent with each other, for example, may be distributed by within the range of 0.1 micrometers or more to less than 1000 micrometers, and within the range of 0.3 micrometers or more to less than 100 micrometers.

Moreover the one direction D1 may meet in tire circumferential direction C or the tire width direction W, and may tilt to these both directions. Further Direction D2 besides the above may meet in tire circumferential direction C or the tire width direction W, and may tilt to these both directions.

And in this embodiment, the length from the lower end of convex portion 90 to an edge is equal to height H of convex portion 90, and is not less than 0.1 micrometer to less than 5 micrometers. Moreover, for example, the convex portion 90 can be molded by forming a minute groove in the inside of the mold (not shown) for molding the pneumatic tire 1 concerned by cutting, electrical discharge machining, or etching processing etc.

As explained above, because height H of convex portion 90 is not less than 0.1 micrometer to less than 5 micrometers according to pneumatic tire 1 related to this embodiment, when driving a snow-and-ice road surface, it becomes possible to make convex portion 90 in the top surface of land part 18 enter the pit formed on the snow-and-ice road surface, and distance of the top surface of land part 18 and a snow-and-ice road surface can be shortened, and it can carry out that it is easy to make these both sides close. Thereby, it can become possible to increase the Van der Waals force of land part 18 and a snow-and-ice road surface, and the braking ability in a snow-and-ice road surface can be raised over a long time.

In addition, when height H of convex portion 90 is less than 0.1 micrometer, there is a possibility that convex portion 90 may disappear by wear of convex portion 90 accompanying a run shortly. Moreover when height H of convex portion 90 is not less than 5 micrometers, it becomes difficult to shorten distance of the top surface of land part 18, and a snow-and-ice road surface, and there is a possibility that it may become difficult to increase the Van der Waals force of land part 18 and a snow-and-ice road surface.

Moreover because pitch P between adjacent convex portions 90 is not less than 0.1 micrometer to less than 1000 micrometers, the Van der Waals force of land part 18 and a snow-and-ice road surface can be increased further.

Namely, when pitch P between adjacent convex portions 90 is less than 0.1 micrometer, it becomes difficult to release tire 1 from mold after the vulcanization in the manufacture process of the pneumatic tire 1 concerned from a mold, and is easy to damage convex portion 90, and because it cannot form in the shape where convex portion 90 was meant, there is a possibility that it may become difficult to shorten distance of the top surface of land part 18 and a snow-and-ice road surface. When pitch P between adjacent convex portions 90 is not less than 1000 micrometers, against the quality of a snow-and-ice road surface, because pitch P is too large, there is a possibility that it may become difficult to shorten distance of the top surface of land part 18 and a snow-and-ice road surface.

(4-2) Modification 1

Next, the pneumatic tire concerning Modification 1 of 4th embodiment is explained. In Modification 1, the numerals same about the same portion as the component in a 4th embodiment are attached, the explanation is omitted and only a different point is explained.

In pneumatic tire 1 related to Modification 1, it replaces with many convex portions 90, and many concave portions 80 open space in the top surface of a land part, and are placed in it side by side. Concave portion 80 has become depressed toward the inner side of tire diameter direction R from the top surface, and many concave portions 80 of each other are formed the same shape and same-size. Moreover concave portion 80 has become depressed cylindrical and the bottom of this concave portion 80 has extended over the top surface of land part 18 in the example of illustration. Further Concave portion 80 has become depressed along with tire diameter direction R, and center line O3 of concave portion 80 has extended along with tire diameter direction R. In addition, no less than 0.1 micrometer to less than 100 micrometers of inside diameters L3 of concave portion 80 are preferably good also as not less than 0.5 micrometers to less than 100 micrometers, for example like outer diameter L1 of convex portion 90 in the embodiment.

Pitch P between adjacent concave portions 80 of many concave portions 80, i.e., the space of center line O3 comrades of adjacent concave portion 80, is equivalent with each other, and they are placed regularly. In the example of illustration, multiple concave portions 80 open equivalent space in the one direction D1, and are arranged, concave portion line 62 which extends in the one direction D1 is made, and this concave portion line 62 opens equivalent space in the direction D2 besides the above, and the position is shifted and arranged in the one direction D1. And pitch P between concave portions 80 adjacent in the one direction D1, and direction D2 besides the above is equivalent with each other. In addition, pitch P between adjacent concave portions 80 are not less than 0.1 micrometer and less than 1000 micrometers, preferably not less than 0.3 micrometers to less than 100 micrometers. Here, pitch P between adjacent concave portions 80 may not be equivalent with each other, for example, may differ in within the range of 0.1 micrometers or more to less than 1000 micrometers, or within the range of 0.3 micrometers or more to less than 100 micrometers.

And in this embodiment, for example, depth D of concave portion 80 is the length from the opening surface of concave portion 80 to a bottom, and is not less than 0.1 micrometer to less than 5 micrometers. In addition, The concave portion 80 can be molded by forming a minute projection in the inside of the mold (not shown) which molds the pneumatic tire 1 concerned by cutting, electrical discharge machining, or etching processing etc.

As explained above, according to pneumatic tire 1 applied to this embodiment. Because depth D of concave portion 80 is not less than 0.1 micrometer to less than 5 micrometers, when running a snow-and-ice road surface top, it is possible to make the projection formed on the snow-and-ice road surface enter, distance of the top surface of a land part and a snow-and-ice road surface can be shortened, and these both sides are close to the concave portion in the top surface of a land part. Thereby, it becomes possible to increase the Van der Waals force of a land part and a snow-and-ice road surface, and it can improve the braking ability in a snow-and-ice road surface over a long time.

Moreover because pitch P between adjacent concave portions 80 is not less than 0.1 micrometer to less than 1000 micrometers, the Van der Waals force of land part 18 and a snow-and-ice road surface can be increased further.

Namely, when pitch P between adjacent concave portions 80 is less than 0.1 micrometer, it becomes difficult to release tire 1 from mold after the vulcanization in the manufacture process of the pneumatic tire 1 concerned from a mold, and is easy to damage concave portion 80, and because it is hard coming to form in the shape where concave portion 80 was meant, there is a possibility that it may become difficult to shorten distance of the top surface of a land part and a snow-and-ice road surface. Moreover when pitch P between adjacent concave portions 80 is not less than 1000 micrometers, because pitch P is too large, there is a possibility that it may become difficult to shorten distance of the top surface of a land part and a snow-and-ice road surface, against the quality of a snow-and-ice road surface.

(4-3) Evaluation Result

Next, the 1st about operation effect explained above to 4th verification examination was carried out.

In the 1st verification examination, it verified about the height of the minute convex portion. In the 1st verification test, the five pneumatic tires of embodiment 4-1 to 4-3 and the comparative example 4-1, and 4-2 were prepared.

The composition of each pneumatic tire of embodiment 4-1 to 4-3 adopted in common the same composition as the pneumatic tire shown in a 4th embodiment, and by within the range of 0.1 micrometer or more to less than 5 micrometers, as shown in the following table 4, it changed the height of minute convex portion to each other. About and each pneumatic tire of comparative example 4-1 and 4-2, the height of the minute convex portion was changed with each other, as shown in the following table 4, out of the range of 0.1 micrometer or more to less than 5 micrometers. In addition, size of each pneumatic tire was set to 195/65R15.

And the period until the braking performance in the snow-and-ice road surface and minute convex portion disappear about each pneumatic tire of embodiment 4-1 to 4-3 and the comparative example 4-1, and 4-2 was evaluated.

By the evaluation about the braking ability in a snow-and-ice road surface, first of all, Each pneumatic tire which equipped the regular rim and set internal pressure to 200 kPa is attached to a passenger car, and where loading of the regular load is carried out, the real vehicle run of the snow-and-ice road surface top is carried out, braking distance until it will be in a state of rest, applying full brakes as 35 km/h of initial velocity was measured, and average braking deceleration was computed from initial velocity and braking distance. "regular rim" means the standard rim in the application size provided in "JATMA Year Book" (2011 editions), "regular load" means the maximum load in application size ply rating provided in "JATMA Year Book" (2011 editions).

And the evaluation index based on the average braking deceleration of the pneumatic tire of comparative example 4-1 was set to 100, and the index estimated relatively the braking ability in the snow-and-ice road surface of each pneumatic tire.

In addition, by the evaluation about the period until minute convex portion disappears, first Where it attached to the passenger car each pneumatic tire with which the normal rim was equipped and which was set as prescribed inner pressure and load of the regular load is performed, the real vehicle run of the snow-and-ice road surface top was performed, and the period until minute convex portion disappears was measured.

And the period until the minute convex portion in the pneumatic tire of comparative example 4-1 disappears was set to 100, and the index estimated the period of each pneumatic tire relatively.

A result is shown in the following table 4.

TABLE 4

|  | comparative example 4-1 | embodiment 4-1 | embodiment 4-2 | embodiment 4-3 | comparative example 4-2 |
| --- | --- | --- | --- | --- | --- |
| Height of minute convex portion (μm) | 0.08 | 0.1 | 1 | 4.8 | 6 |
| Braking performance on the snow-and-ice road surface | 100 | 108 | 110 | 107 | 102 |
| Period until the minute convex portion disappears | 100 | 104 | 105 | 104 | 100 |

As mentioned above, each pneumatic tire of embodiment 4-1 to 4-3 had the high braking ability in a snow-and-ice road surface compared with comparative example 4-2, and it was checked that a minute convex portion is present over a long time compared with comparative example 4-1.

Next, in the 2nd verification examination, it verified about the pitch between adjacent minute convex portions. In the 2nd verification test, the five pneumatic tires of embodiment 4-4 to 4-6 and the comparative example 4-3, and 4-4 were prepared.

The same composition as the pneumatic tire shown in a 4th embodiment was used for each pneumatic tire of embodiment 4-4 to 4-6 in common, and by within the range of 0.1 micrometers or more to less than 1000 micrometers, as shown in the following table 5, it changed the pitch between adjacent minute convex portion to each other. And each pneumatic tire of comparative example 4-3 and 4 changed the pitch between adjacent minute convex portions with each other, as shown in the following table 5, in the outside of the range of 0.1 micrometer or more to less than 1000 micrometers, size of each pneumatic tire was set to 195/65R15.

And, about and each pneumatic tire of embodiment 4-4 to 4-6 and the comparative example 4-3, and 4-4, the braking performance in the snow-and-ice road surface was evaluated. The evaluation about the braking ability in a snow-and-ice road surface presupposed that it is the same as that of the 1st verification examination.

A result is shown in the following table 5.

TABLE 5

|  | comparative example 4-2 | embodiment 4-4 | embodiment 4-5 | embodiment 4-6 | comparative example 4-4 |
|---|---|---|---|---|---|
| Pitch between adjacent minute convex portion (μm) | 0.08 | 0.1 | 100 | 999 | 1010 |
| Braking performance on the snow-and-ice road surface | 100 | 108 | 111 | 106 | 102 |

As mentioned above, in each pneumatic tire related to embodiment 4-4 to 4-6, it was checked compared with the comparative example 4-3 and 4-4 that the braking performance in the snow-and-ice road surface is high.

Next, in the 3rd verification examination, it verified about the depth of the concave portion. In the 3rd verification test, the five pneumatic tires of embodiment 4-7 to 4-9 and the comparative example 4-5, and 4-6 were prepared.

The same composition as the pneumatic tire shown in Modification 1 was used for each pneumatic tire of embodiment 4-7 to 4-9 in common, and by within the range of 0.1 micrometers or more to less than 5 micrometers, as shown in the following table 6, it changed the depth of the concave portion to each other. And each pneumatic tire of comparative example 4-5 and 4-6 changed the depth of the concave portion with each other, as shown in the following table 6, out of the range of 0.1 micrometer or more to less than 5 micrometers, size of each pneumatic tire was set to 195/65R15.

And the period until the braking ability in a snow-and-ice road surface and a concave portion disappear about each pneumatic tire of embodiment 4-7 to 4-9 and comparative example 4-5, and 4-6 was evaluated. The evaluation about the braking ability in a snow-and-ice road surface and the evaluation about a period until a concave portion disappears presupposed that it is the same as that of the 1st verification examination.

A result is shown in the following table 6.

As mentioned above, each pneumatic tire of embodiment 4-7 to 4-9 had the high braking ability in a snow-and-ice road surface compared with comparative example 4-6, and it was checked that a concave portion is present over a long time compared with comparative example 4-5.

Next, in the 4th verification examination, it verified about the pitch between adjacent concave portions. For the 4th verification test, the five pneumatic tires of embodiment 4-10 to 4-12 and the comparative example 4-7, and 4-8 were prepared.

The same composition as the pneumatic tire shown in Modification 1 is used for each pneumatic tire of embodiment 4-10 to 4-12 in common, the pitch between the adjacent concave portions was changed to each other, as shown in the following table 7, within the range of 0.1 micrometers or more to less than 1000 micrometers, and each pneumatic tire of comparative example 4-7 and 8 changed the pitch between adjacent concave portions with each other, as shown in the following table 7, out of the range of 0.1 micrometer or more to less than 1000 micrometers, size of each pneumatic tire was set to 195/65R15.

And the braking performance in the snow-and-ice road surface was evaluated about each pneumatic tire of embodiment 4-10 to 4-12 and the comparative example 4-7, and 4-8. The evaluation about the braking ability in a snow-and-ice road surface presupposed that it is the same as that of the 1st verification examination.

A result is shown in the following table 7.

TABLE 6

|  | comparative example 4-6 | embodiment 4-7 | embodiment 4-8 | embodiment 4-9 | comparative example 4-8 |
|---|---|---|---|---|---|
| Depth of minute concave portion (μm) | 0.08 | 0.1 | 1 | 4.9 | 6 |
| Braking performance on the snow-and-ice road surface | 100 | 109 | 112 | 110 | 103 |
| Period until the minute concave portion disappears | 100 | 106 | 107 | 106 | 100 |

TABLE 7

|  | comparative example 4-7 | embodiment 4-10 | embodiment 4-11 | embodiment 4-12 | comparative example 4-8 |
|---|---|---|---|---|---|
| Pitch between adjacent minute concave portion (μm) | 0.08 | 0.1 | 100 | 988 | 1010 |
| Braking performance on the snow-and-ice road surface | 100 | 108 | 111 | 106 | 102 |

As mentioned above, it was checked that each pneumatic tire of embodiment 4-10 to 4-12 has the braking ability higher than comparative example 4-7 and 4-8 in a snow-and-ice road surface.

5th Embodiment

Below, a 5th embodiment is described.

A pneumatic tire related to the present invention is characterized as a pneumatic tire equipped with rim and formed a tire inner cavity between these rims, wherein on an internal surface of the pneumatic tire forming the tire inner cavity, many minute convex portions or concave portions are placed with space between adjacent one, and the pitch between the adjacent minute convex portions or the pitch between the adjacent concave portions is not less than 0.1 micrometer to less than 1000 micrometers.

According to this invention, because the pitch between adjacent minute convex portions or the pitch between adjacent concave portions is not less than 0.1 micrometers to less than 1000 micrometers, when the pneumatic tire concerned rotates, it can repress that the air on the internal surface of the tire concerned in a tire inner cavity follows and moves to the internal surface of a tire, and the turbulent flow of the air which goes back on the internal surface of a tire in the rotative direction of a tire can be yielded. Thereby, it becomes possible to make the heat yielded into a tire at the time of a run radiate heat from the internal surface side of a tire, the rise in heat of a tire is suppressed and durable reservation becomes easy.

In addition, the height of the minute convex portion or the depth of the concave portion may be not less than 0.1 micrometer to less than 1000 micrometers.

In this case, because the height of a minute convex portion or the depth of the concave portion is not less than 0.1 micrometer to less micrometer to less than 1000 micrometers, it can carry out the heat yielded into a tire at the time of a run that it is much more easy to make heat radiate from the inside side of a tire.

(5-1) Shape and Arrangement of Convex Portion

Between adjacent things, many convex portions 90 open space and are placed by the inside of the pneumatic tire 1 concerned which forms tire inner cavity A. According to this embodiment, convex portion 90 is placed by the portion positioned inside tire diameter direction R against tread part 40 among the insides, and it protrudes toward the inner side of tire diameter direction R from this inside, and many convex portions 90 are the-same-shape-same-size-boiled with each other, and are formed. Convex portion 90 was formed cylindrical and the end face of convex portion 90 has extended over the inside of the pneumatic tire 1 concerned in the example of illustration. Convex portion 90 protrudes along with tire diameter direction R, and center line O1 of convex portion 90 has extended along with tire diameter direction R.

In addition, the length from the end face of convex portion 90 which is height H of convex portion 90 to an edge is not less than 0.1 micrometer to less than 1000 micrometers. As the outer diameter L1 of the convex portion 90, not less than 0.1 micrometer to less than 100 micrometers can be preferably set to not less than 0.5 micrometers to less than 100 micrometers, for example.

Many convex portions 90 are regularly placed so that pitch P between adjacent convex portions 90, i.e., the space of center line O1 comrades of adjacent convex portion 90, may become equivalent with each other. In the example of illustration, multiple convex portions 90 open equivalent space in the one direction D1 in alignment with the inside of the pneumatic tire 1 concerned, and are arranged, and the line which extends in the one direction D1 is made, and this line opens equivalent space in other direction D2 which intersects perpendicularly in the one direction D1 over the inside, and is arranged. And pitch P between convex portions 90 which adjoin the one direction D1 and the other direction D2 is equivalent with each other.

In addition, the one direction D1 may meet in tire circumferential direction C or the tire width direction W, and may tilt to these both directions. The other direction D2 may also meet in tire circumferential direction C or the tire width direction W, and may tilt to these both directions.

And in this embodiment, pitch P between adjacent convex portions 90 are not less than 0.1 micrometer to less than 1000 micrometers or are not less than 0.3 micrometers to less micrometer to less than 100 micrometers preferably. Pitch P between adjacent convex portions 90 may not be equivalent with each other, for example, may differ in within the range of 0.1 micrometer to less than 1000 micrometers, or within the range of 0.3 micrometers to less than 100 micrometers.

The convex portion 90 can be molded here, for example, by forming a minute groove in the inside of the mold (not shown) for molding the pneumatic tire 1 concerned by cutting, electrical discharge machining, or etching processing etc.

As explained above, because pitch P between adjacent convex portions 90 is not less than 0.1 to micrometer to less than 1000 micrometers according to pneumatic tire 1 related to this embodiment, when the pneumatic tire 1 concerned rotates, it is repressed that the air on the internal surface of the tire 1 concerned in tire inner cavity A follows and moves to the tire 1 internal surface, on the internal surface of tire 1, the turbulent flow of the air which moves against the rotative direction of tire 1 can be yielded. Thereby, it becomes possible to make the heat yielded into tire 1 at the time of a run radiate heat from the internal surface side of tire 1, the rise in heat of tire 1 is repressed and durable reservation can be performed easily.

In addition, because height H of convex portion 90 is not less than 0.1 micrometer to less than 1000 micrometers, it can carry out the heat yielded into tire 1 at the time of a run that it is much more easy to make heat radiate from the inside side of tire 1.

(5-2) Modification 1

Next, the pneumatic tire related to Modification 1 of the 5th embodiment is explained. In modification 1, the numerals same about the same portion as the component in a 5th embodiment are attached, the explanation is omitted and only a different point is explained.

In pneumatic tire 1 related to modification 2, it replaces with convex portion 90 of the large number, and between adjacent things, many concave portions 80 open space and are placed by the inside of the pneumatic tire 1 concerned. The concave portion 80 has become depressed toward the inner side of tire diameter direction R from the inside, and many concave portions 80 of each other are the-same-shape-same-size-boiled, and are formed. Moreover the concave portion 80 has become depressed cylindrical and the bottom of this concave portion 80 has extended over the inside of the pneumatic tire 1 in the example of the graphic display. Further the concave portion 80 has become depressed along the tire diameter direction R, and the center line O3 of the concave portion 80 has extended along the tire diameter direction R.

In addition, the length from the effective area of the concave portion 80 to the bottom is depth D of the concave portion 80, and has got not less than 0.1 micrometer to less than 1000 micrometers. Moreover, inside diameter L3 of concave portion 80 is like outer diameter L1 of convex portion 90 in the embodiment, for example, not less than 0.1 micrometer to less micrometer to less than 100 micrometers may be not less than 0.5 micrometers to less than 100 micrometers preferably.

Many concave portions 80 are regularly placed so that pitch P between adjacent concave portions 80, i.e., the space of center line O3 comrades of adjacent concave portion 80, may become equivalent with each other. In the example of illustration, concave portion 80 opens equivalent space in the one direction D1, and are arranged, concave portion line 62 which extends in the one direction D1 is made, and this concave portion line 62 opens equivalent space in the other direction D2, and the position is shifted and arranged in the one direction D1. And pitch P between concave portions 80 which adjoin the one direction D1 and the other direction D2 is equivalent with each other.

And according to this embodiment, pitch P between adjacent concave portions 80 is not less than 0.1 micrometers to less than 1000 micrometers.

In addition, for example, the concave portion 80 can be molded by forming a minute projection in the inside of the mold (not shown) for molding the pneumatic tire 1 concerned by cutting, electrical discharge machining, or etching processing etc.

(5-3) Evaluation Result

Next, the 1st to 4th verification examination about operation effect explained above was carried out.

In the 1st verification examination, it verified about the pitch between adjacent minute convex portions. In the 1st verification test, the five pneumatic tires of embodiment 5-1 to 5-3 and the comparative example 5-1, and 5-2 were prepared.

The same structure as the pneumatic tire shown in a 5th embodiment was used for each pneumatic tire of embodiment 5-1 to 5-3 in common, and by within the range of 0.1 micrometers or more to less than 1000 micrometers, as shown in the following table 8, it changed the pitch between adjacent minute convex portions with each other. And each pneumatic tire of comparative example 5-1 and 5-2 changed the pitch between adjacent minute convex portions with each other, as shown in the following table 8, out of the range of 0.1 micrometer or more to less than 1000 micrometers, And endurance was evaluated about each pneumatic tire of embodiment 5-1 to 5-3 and comparative example 5-5-1, and 5-2.

In the evaluation about endurance, each pneumatic tire which equipped the regular rim and set internal pressure to 210 kPa first of all is attached to a drum test machine with the griddle surface 1.7 m in diameter, made to run it under the Centigrade 38 temperature, at 80 km/h, where loading of 150% of the load is carried out against regular load, and mileage until it results in failure was measured. "Regular rim" means the standard rim in the application size provided in "JATMA Year Book" (2011 editions), "Regular load" means the maximum load in application size ply rating provided in "JATMA Year Book" (2011 editions).

And the evaluation index based on the mileage of the pneumatic tire of comparative example 5-1 was set to 100, and the index estimated the endurance of each pneumatic tire relatively.

A result is shown in the following table 8.

TABLE 8

|  | comparative example 5-1 | embodiment 5-1 | embodiment 5-2 | embodiment 5-3 | comparative example 5-2 |
|---|---|---|---|---|---|
| Pitch between adjacent minute convex portion (μm) | 0.08 | 0.1 | 98 | 999 | 1005 |
| Endurance | 100 | 115 | 120 | 108 | 102 |

As mentioned above, it was checked that each pneumatic tire of embodiment 5-1 to 5-3 is excellent in endurance compared with comparative example 5-1 and 5-2.

Next, in the 2nd verification examination, it verified about the height of the minute convex portion. For the 2nd verification test, five pneumatic tires of embodiment 5-4 to 5-6 and the comparative example 5-3, and 5-4 were prepared.

The same composition as the pneumatic tire shown in a 5th embodiment was used for each pneumatic tire of embodiment 5-4 to 5-6 in common, and by within the range of 0.1 micrometers or more to less than 1000 micrometers, as shown in the following table 9, it changed the height of minute convex portion to each other. And each pneumatic tire of comparative example 5-3 and 5-4 changed the height of the minute convex portion with each other, as shown in the following table 9, out of the range of 0.1-micrometer or more to less than 1000 micrometers, And endurance was evaluated about each pneumatic tire of embodiment 5-4 to 5-6 and comparative example 5-3, and 5-4. The evaluation about endurance presupposed that it is the same as that of the 1st above-mentioned verification examination.

A result is shown in the following table 9.

TABLE 9

|  | comparative example 5-3 | embodiment 5-4 | embodiment 5-5 | embodiment 5-6 | comparative example 5-4 |
|---|---|---|---|---|---|
| Height of minute convex portion (μm) | 0.08 | 0.1 | 99 | 999 | 1009 |
| Endurance | 100 | 110 | 112 | 108 | 101 |

As mentioned above, it was checked that each pneumatic tire of embodiment 5-4 to 5-6 is excellent in endurance compared with comparative example 5-3 and 5-4.

Next, in the 3rd verification examination, it verified about the pitch between adjacent concave portions. In the 3rd verification examination, five pneumatic tires of embodiment 5-7 to 5-9 and comparative example 5-5, and 5-6 were prepared.

The same structure as the pneumatic tire shown in modification 1 was used for each pneumatic tire of embodiment 5-7 to 5-9 in common, and by within the range of 0.1 micrometers or more to less than 1000 micrometers, as shown in the following table 10, it changed the pitch between adjacent concave portions with each other. And each pneumatic tire of comparative example 5-5 and 5-6 changed the pitch between adjacent concave portions with each other, as shown in the following table 10, out of the range of 0.1-micrometer or more to less than 1000 micrometers, And endurance was evaluated about each pneumatic tire of embodiment 5-7 to 5-9 and comparative example 5-5, and 5-6. The evaluation about endurance presupposed that it is the same as that of the 1st verification examination.

A result is shown in the following table 10.

TABLE 10

|  | comparative example 5-5 | embodiment 5-7 | embodiment 5-8 | embodiment 5-9 | comparative example 5-6 |
|---|---|---|---|---|---|
| Pitch between adjacent minute concave portion (μm) | 0.08 | 0.1 | 98 | 999 | 1007 |
| Endurance | 100 | 112 | 119 | 110 | 102 |

As mentioned above, it was checked that each pneumatic tire of embodiment 5-7 to 5-9 is excellent in endurance compared with comparative example 5-5 and 5-6.

Next, in the 4th verification examination, it verified about the depth of the concave portion. In the 4th verification examination, five pneumatic tires of embodiment 5-10 to 5-12 and comparative example 5-7, and 5-8 were prepared.

The same structure as the pneumatic tire shown in Modification 1 was used for each pneumatic tire of embodiment 5-10 to 5-12 in common, and by within the range of 0.1 micrometers or more to less than 1000 micrometers, as shown in the following table 11, it changed the depth of the concave portion with each other. And each pneumatic tire of comparative example 5-7 and 5-8 changed the depth of the concave portion with each other, as shown in the following table 11, out of the range of 0.1-micrometer or more to less than 1000 micrometers, And endurance was evaluated about each pneumatic tire of embodiment 5-10 to 5-12 and comparative example 5-7, and 5-8. The evaluation about endurance presupposed that it is the same as that of the 1st verification examination.

A result is shown in the following table 11.

TABLE 11

|  | comparative example 5-7 | embodiment 5-10 | embodiment 5-11 | embodiment 5-12 | comparative example 5-8 |
|---|---|---|---|---|---|
| Depth of minute concave portion (μm) | 0.08 | 0.1 | 9.8 | 999 | 1006 |
| Endurance | 100 | 110 | 115 | 109 | 103 |

As mentioned above, it was checked that each pneumatic tire of embodiment 5-10 to 5-12 is excellent in endurance compared with comparative example 5-7 and 5-8.

6 th Embodiment

Below, 6th embodiment is described.

A pneumatic tire related to a 6th embodiment is characterized as a pneumatic tire formed sipings extended in the tire width direction on a land part placed in a tread portion, wherein in a wall surface facing a tire circumferential direction among the wall surfaces formed sipings, many minute convex portions are placed with space between adjacent one, the many minute convex portions placed on the wall surface countering with each other in a tire circumferential direction are placed so that a height of the minute convex portion and a pitch between adjacent minute convex portions set to equivalent with each other, a height of the minute convex portion is not less than 0.1 micrometers to less than 20 micrometers.

According to this invention, because the height of the minute convex portion is not less than 0.1 micrometer to less than 20 micrometers, when the wall surface of the siping which a land part is bent and changed by the tire circumferential direction, and counters a tire circumferential direction at the time of a run approaches with each other, it is possible to carry out the many minute convex portions placed according to each by these wall surfaces that it is easy to make mutual space enter, Van der Waals force can be increased, and it can stop that these wall surfaces slide.

Therefore, in the land part, each part positioned in the tire circumferential direction on both sides of the siping is made to act as if it follows the tire circumferential direction and made in one, making easy to secure flexural rigidity on the appearance of the land part gets possible, and the bending deflection to the tire circumferential direction of the land part can be controlled. Thereby, suppressing the fall of the braking ability to the tire circumferential direction of a land part bend and according to modification, it can become possible to form many sipings in a land part, and the braking ability in a snow-and-ice road surface can be raised over a long time.

The pitch between the adjacent minute convex portions may be not less than 0.1 micrometers to less than 1000 micrometers.

In this case, because the pitch between adjacent minute convex portions is not less than 0.1 micrometers to less than 1000 micrometers, it can increase further the Van der Waals force in the wall surface of the siping which counters a tire circumferential direction.

(6-1) Shape and Arrangement of Convex Portion

In the wall surface 22 facing a tire circumferential direction C among the wall surfaces formed sipings 21, many minute convex portions 90 are placed with space between adjacent one. The convex portion 90 protrudes toward tire circumferential direction C from the wall surface 22, and many convex portions 90 are the-same-shape-same-size-boiled with each other, and are formed. Moreover the convex portion 90 was formed cylindrical and the end face of convex portion 90 has extended over wall surface 22 of siping 21 in the example of illustration. Further Convex portion 90 protrudes along with tire circumferential direction C, and center line O1 of convex portion 90 has extended along with tire circumferential direction C. In addition, it is good also considering outer diameter L1 of convex portion 90 as, for example, not less than 0.1 micrometers to less than 100 micrometers, may be not less than 0.5 micrometers to less than 100 micrometers preferably.

Many convex portions 90 are regularly placed so that pitch P between adjacent convex portions 90, i.e., the space of center line O1 comrades of adjacent convex portion 90, may become equivalent with each other. In the example of the graphic display, a plurality of convex portions 90 open the equivalent crevice in the one direction D1 which meets the wall surface 22 of the siping 21, and are arranged, and the convex portion line which extends in the one direction D1 is made, and this convex portion line opens the equivalent crevice in the other direction D2 which crosses perpendicularly in the one direction D1 over the wall surface 22, and is arranged. And pitch P between convex portions 90 which adjoin the one way D1 and the other direction D2 has become equivalent with each other, the pitch P between adjacent convex portions 90 are not less than 0.1 micrometers to less than 1000 micrometers or are not less than 0.3 micrometers to less than 100 micrometers preferably.

Here, convex portion 90 of a large number placed by wall surface 22 which counters tire circumferential direction C is placed so that pitch P between convex portions 90 which adjoin height H of convex portion 90 may become equivalent with each other.

And according to this embodiment, height H of convex portion 90 as the length from the end face of convex portion 90 to an edge, is not less than 0.1 micrometer to less than 20 micrometers, preferably is not less than 0.3 micrometers to less than 10 micrometers. The convex portion 90 can be molded by, for example, forming a minute groove in the internal surface of the illustration-less mold for molding this pneumatic tire 1 by cutting, electrical discharge machining, or etching processing etc.

(6-2) Evaluation Result

Next, the 1st and the 2nd verification examination about the operation effect explained above were carried out.

In the 1st verification examination, it verified about the height of the minute convex portion. In the 1st verification examination, five pneumatic tires of embodiment 6-1 to 6-3 and comparative example 6-1, and 6-2 were prepared.

The same structure as the pneumatic tire shown in a 6th embodiment was used for each pneumatic tire of embodiment 6-1 to 6-3 in common, and by within the range of 0.1 micrometers or more to less than 20 micrometers, as shown in the following table 12, it changed the height of the minute convex portion with each other. And each pneumatic tire of comparative example 6-1 and 6-2 changed the height of the minute convex portion with each other, as shown in the following table 12, in the outside of the range of 0.1 micrometer or more to less than 20 micrometers, size of each pneumatic tire was set to 195/65R15.

And each pneumatic tire of embodiment 6-1 to 6-3 and comparative example 6-1, and 6-2 was attached and evaluated, without the braking ability in a snow-and-ice road surface, and a period until a minute convex portion disappears.

Where it attached to the passenger car each pneumatic tire which equipped the normal rim and set internal pressure to 200 kPa first in the evaluation about the braking performance in the snow-and-ice road surface and load of the regular load is performed, The real vehicle run of the snow-and-ice road surface top was performed, braking distance until it will be in the state of rest, applying full brakes as 35 km/h of the initial velocity was measured, and average braking deceleration was calculated from the initial velocity and braking distance. The "normal rim" points the par rim in the application size set in "JATMA Year Book" (2011 editions), "regular load" means the rated capacity in application size ply rating set in "JATMA Year Book" (2011 editions).

And the evaluation index based on the average braking deceleration of the pneumatic tire of the comparative example 6-1 was set to 100, and the index estimated relatively the braking performance in the snow-and-ice road surface of each pneumatic tire.

And, in the evaluation about the period until minute convex portion disappears, where it attached to the passenger car each pneumatic tire with which the normal rim was equipped and which was first made into prescribed inner pressure and load of the regular load is performed, the real vehicle run of the snow-and-ice road surface top was performed, and the period until minute convex portion disappears was measured.

And the period until the minute convex portion in the pneumatic tire of the comparative example 6-1 disappears was set to 100, and the index estimated the period of each pneumatic tire relatively.

The result is shown in the following table 12.

TABLE 12

|  | comparative example 6-1 | embodiment 6-1 | embodiment 6-2 | embodiment 6-3 | comparative example 6-2 |
|---|---|---|---|---|---|
| Height of minute convex portion (μm) | 0.08 | 0.1 | 5 | 19.5 | 20.5 |
| Braking performance on the snow-and-ice road surface | 100 | 108 | 112 | 107 | 102 |
| Period unitil the minute convex portion disappears | 100 | 105 | 109 | 104 | 101 |

As mentioned above, each pneumatic tire of embodiment 6-1 to 6-3 had the high braking performance in the snow-and-ice road surface compared with the comparative example 6-2, and it was checked that minute convex portion exists over the long period of time compared with the comparative example 6-1.

Next, in the 2nd verification examination, it verified about the pitch between adjacent minute convex portions. In the 2nd verification test, the five pneumatic tires of embodiment 6-4 to 6-6 and the comparative example 6-3, and 6-4 were prepared.

The same composition as the pneumatic tire shown in a 6th embodiment is used for each pneumatic tire of embodiment 6-4 to 6-6 in common, the pitch between adjacent minute convex portion was changed to each other, as shown in the following table 13 within the range of 0.1 micrometers or more to less than 1000 micrometers, and each pneumatic tire of the comparative example 6-3 and 6-4 changed the pitch between adjacent minute convex portion to each other, as shown in the following table 13, out of the range of 0.1 micrometers or more to less than 1000 micrometers. Size of each pneumatic tire was set to 195/65R15.

And the braking performance in the snow-and-ice road surface was evaluated about each pneumatic tire of embodiment 6-4 to 6-6 and the comparative example 6-3, and 6-4. Evaluation about the braking performance in the snow-and-ice road surface was made to be the same as the 1st verification test.

Results are shown in the following table 13.

TABLE 13

|  | comparative example 6-3 | embodiment 6-4 | embodiment 6-5 | embodiment 6-6 | comparative example 6-4 |
|---|---|---|---|---|---|
| pitch between adjacent minute convex portion (μm) | 0.08 | 0.1 | 90 | 999 | 1005 |
| Braking performance on the snow-and-ice road surface | 100 | 107 | 110 | 105 | 101 |

As mentioned above, it was checked that each pneumatic tire of embodiment 6-4 to 6-6 has the braking performance higher than the comparative example 6-3 and 6-4 in the snow-and-ice road surface.

Other Embodiments

As described above, while the contents of the present invention were disclosed through the embodiment of the present invention, it should not be understood that the discussions and drawings forming a part of this disclosure limit the present invention. From this disclosure, a variety of substitutive embodiments, examples, and operational techniques would be self-evident to one skilled in the art.

For example, the embodiment of the present invention can be changed as follows. According to the embodiment mentioned above, although the crevice 80, either or the convex portion 90 are made in some areas on the tire surface 50 (the tire side part 30, either or the groove 10), the crevice 80, either or the convex portion 90 may be made in all the areas on the tire surface 50.

And some areas on the tire surface 50 (the tire side part 30, either or the groove 10) may be made combining the concave portion 80 and the convex portion 90.

More the embodiment and modification mentioned above can also be combined. Thus, the present invention should understand including various embodiments etc. which have not been indicated here. Therefore, the present invention is limited by only the matter to define the invention of the appropriate claim from this disclosing.

In addition, the entire content of Japanese Patent Application No. 2012-033339 (filed on Feb. 17, 2012), Japanese Patent Application No. 2012-033343 (filed on Feb. 17, 2012), Japanese Patent Application No. 2012-032892 (filed on Feb. 17, 2012), Japanese Patent Application No. 2012-032893 (filed on Feb. 17, 2012), and Japanese Patent Application No. 2012-032894 (filed on Feb. 17, 2012) are incorporated in the present description by reference.

INDUSTRIAL APPLICABILITY

According to the present invention, the tire and tire manufacturing method which can control rotation resistance much more can be provided.

The invention claimed is:

1. A tire provided with concave portions dented toward a tire inner side direction from a tire surface, and regularly arranged in at least some areas on the tire surface, wherein
in a direction along with the tire surface, a maximum width L of the concave portions is in a range of 0.1 micrometer or more to less than 50 micrometers,
a depth D reaching to a point of the innermost part of the concave portions toward the tire inner side direction from the tire surface is within a range of 0.1 micrometer or more to less than 10 micrometers,
in the direction along with the tire surface, an arrangement interval P of the concave portions is within a range more largely than 0.1 micrometer to less than 100 micrometers,
wherein the concave portions have a circle shape with maximum width L as diameter.

2. The tire according to the claim 1 comprising a tread part and a pair of tire side parts formed in the outside in the tread width direction of the tread part wherein
    said some areas on the tire surface are areas for forming a tire outer surface in the tire side part.

3. The tire according to claim 2 comprising a tread part and a pair of tire side parts formed in the outside in the tread width direction of the tread part wherein
    a groove extending in a tire circumferential direction or a direction that intersects the tire circumferential direction is formed on the tread part,
    the groove has a pair of groove wall surfaces and a groove bottom side,
    said some areas on the tire surface are areas for forming either the pair of groove wall surfaces or the groove bottom side at least.

4. The tire according to claim 1 comprising a tread part and a pair of tire side parts formed in the outside in the tread width direction of the tread part wherein
    a groove extending in a tire circumferential direction or a direction that intersects the tire circumferential direction is formed on the tread part,
    the groove has a pair of groove wall surfaces and a groove bottom side,
    said some areas on the tire surface are areas for forming either the pair of groove wall surfaces or the groove bottom side at least.

5. A tire manufacturing method for manufacturing the tire according to claim 1 using a tire molding die for molding the tire before vulcanization as a green tire, wherein
    a concave formation part for molding the concave portions in at least some areas on the tire surface is formed on an inner skin of the tire molding die, and comprising
    a vulcanization process for molding the tire using the tire molding die for molding the concave portions to the green tire.

6. The tire manufacturing method according to the claim 5 wherein the concave formation part is formed in the inner skin of the tire molding die by laser processing.

7. A tire manufacturing method for manufacturing the tire according to claim 2 using a tire molding die for molding the tire before vulcanization as a green tire, wherein
    a concave formation part for molding the concave portions in at least some areas on the tire surface is formed on an inner skin of the tire molding die, and comprising
    a vulcanization process for molding the tire using the tire molding die for molding the concave portions to the green tire.

8. The tire manufacturing method according to the claim 7 wherein the concave formation part is formed in the inner skin of the tire molding die by laser processing.

9. A tire manufacturing method for manufacturing the tire according to claim 4 using a tire molding die for molding the tire before vulcanization as a green tire, wherein
    a concave formation part for molding the concave portions in at least some areas on the tire surface is formed on an inner skin of the tire molding die, and comprising
    a vulcanization process for molding the tire using the tire molding die for molding the concave portions to the green tire.

10. The tire manufacturing method according to the claim 9 wherein the concave formation part is formed in the inner skin of the tire molding die by laser processing.

\* \* \* \* \*